(12) United States Patent
Yoshida

(10) Patent No.: US 9,185,264 B2
(45) Date of Patent: Nov. 10, 2015

(54) PRINT CONTROL DEVICE CAPABLE OF GENERATING IMAGE DATA USING PLURALITY OF ERROR MATRICES

(71) Applicant: BROTHER KOGYO KABUSHIKI KAISHA, Aichi (JP)

(72) Inventor: Yasunari Yoshida, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 203 days.

(21) Appl. No.: 13/631,073

(22) Filed: Sep. 28, 2012

(65) Prior Publication Data

US 2013/0163010 A1  Jun. 27, 2013

(30) Foreign Application Priority Data

Dec. 27, 2011  (JP) ................. 2011-286946

(51) Int. Cl.
G06K 15/10 (2006.01)
H04N 1/405 (2006.01)
B41J 19/14 (2006.01)

(52) U.S. Cl.
CPC ............. *H04N 1/4052* (2013.01); *B41J 19/142* (2013.01)

(58) Field of Classification Search
USPC ............................................... 358/1.13–1.18
See application file for complete search history.

(56) References Cited

U.S. PATENT DOCUMENTS 6,435,643 B1 *  8/2002  Miura et al. ................ 347/19
6,454,390 B1    9/2002  Takahashi et al.
2002/0113985 A1  8/2002  Tayuki
2006/0170973 A1 *  8/2006  Takahashi ................ 358/3.03
2006/0256172 A1 * 11/2006  Kobayashi ................ 347/86

FOREIGN PATENT DOCUMENTS

| JP | 2000-037937 A | 2/2000 |
| JP | 2000-127375 A | 5/2000 |
| JP | 2001-150700 A | 6/2001 |
| JP | 2001-334655 A | 12/2001 |
| JP | 2006-231903 A | 9/2006 |
| JP | 2006-315411 A | 11/2006 |
| JP | 2009-056719 A | 3/2009 |

OTHER PUBLICATIONS

Japanese Office Action dated Sep. 29, 2015 received in related application JP 2011-286946 together with an English language translation.

* cited by examiner

*Primary Examiner* — Marivelisse Santiago Cordero
*Assistant Examiner* — Kevin Ky
(74) *Attorney, Agent, or Firm* — Scully, Scott, Murphy & Presser P.C.

(57) ABSTRACT

A print control device acquires image data. Each pixel data has a gradation value represented by a first number of levels of gradation. The print control device acquires a first error matrix and a second error matrix and generates print image data representing an image by performing a halftone process on the image data using the first and second error matrices to convert each gradation value in the image data into a set of dot data. Each dot data represents one of a second number of types of dot formation. The second number is smaller than the first number. The print control device uses the first error matrix for pixel data corresponding to a pixel to be printed in a forward direction. The print control device uses the second error matrix for pixel data corresponding to a pixel to be printed in a reverse direction.

27 Claims, 26 Drawing Sheets

FIG. 8 (A)
S = 0

MAa: 
| PX1 | PX2 | * | 2 | 1 | ←LM1 |
| 0 | 1 | 2 | 1 | 0 | ←LM2 |
| 0 | 0 | 1 | 0 | 0 | ←LM3 |

PX3 PX4 PX5

MAb:
| 1 | 2 | * |  |  | ←LM1 |
| 0 | 1 | 2 | 1 | 0 | ←LM2 |
| 0 | 0 | 1 | 0 | 0 | ←LM3 |

MBa:
| | | * | 2 | 1 | ←LM1 |
| 0 | 0 | 1 | 2 | 1 | ←LM2 |
| 0 | 0 | 1 | 0 | 0 | ←LM3 |

MBb:
| 1 | 2 | * | | | ←LM1 |
| 1 | 2 | 1 | 0 | 0 | ←LM2 |
| 0 | 0 | 1 | 0 | 0 | ←LM3 |

MCa:
| | | * | 2 | 1 | ←LM1 |
| 0 | 0.5 | 1.5 | 1.5 | 0.5 | ←LM2 |
| 0 | 0 | 1 | 0 | 0 | ←LM3 |

MCb:
| 1 | 2 | * | | | ←LM1 |
| 0.5 | 1.5 | 1.5 | 0.5 | 0 | ←LM2 |
| 0 | 0 | 1 | 0 | 0 | ←LM3 |

MDa:
| | | * | 32 | 16 | ←LM1 |
| 0 | 15 | 31 | 17 | 1 | ←LM2 |
| 0 | 0 | 16 | 0 | 0 | ←LM3 |

MDb:
| 16 | 32 | * | | | ←LM1 |
| 1 | 17 | 31 | 15 | 0 | ←LM2 |
| 0 | 0 | 16 | 0 | 0 | ←LM3 |

→Dy ↓Dx

S = 0

|    | | | | | | | | | | | | | | |
|----|---|---|---|---|---|---|---|---|---|---|---|---|---|---|
| F1 | 0 | 0 | 0 | 0 | 255 | 255 | 255 | 255 | 255 | 255 | 255 | 0 | 0 | 0 |
| R1 | 0 | 0 | 0 | 0 | 255 | 255 | 255 | 255 | 255 | 255 | 255 | 0 | 0 | 0 |
| F2 | 0 | 0 | 0 | 0 | 255 | 255 | 255 | 255 | 255 | 255 | 255 | 0 | 0 | 0 |
| R2 | 0 | 0 | 0 | 0 | 255 | 255 | 255 | 255 | 255 | 255 | 255 | 0 | 0 | 0 |
| F3 | 0 | 0 | 0 | 0 | 255 | 255 | 255 | 255 | 255 | 255 | 255 | 0 | 0 | 0 |
| R3 | 0 | 0 | 0 | 0 | 255 | 255 | 255 | 255 | 255 | 255 | 255 | 0 | 0 | 0 |
| F4 | 0 | 0 | 0 | 0 | 255 | 255 | 255 | 255 | 255 | 255 | 255 | 0 | 0 | 0 |
| R4 | 0 | 0 | 0 | 0 | 255 | 255 | 255 | 255 | 255 | 255 | 255 | 0 | 0 | 0 |

S = +1

|    | | | | | | | | | | | | | | |
|----|---|---|---|---|---|---|---|---|---|---|---|---|---|---|
| F1 | 0 | 0 | 0 | 128 | 255 | 255 | 255 | 255 | 255 | 255 | 128 | 0 | 0 | 0 |
| R1 | 0 | 0 | 0 | 0 | 128 | 255 | 255 | 255 | 255 | 255 | 255 | 128 | 0 | 0 |
| F2 | 0 | 0 | 0 | 128 | 255 | 255 | 255 | 255 | 255 | 255 | 128 | 0 | 0 | 0 |
| R2 | 0 | 0 | 0 | 0 | 128 | 255 | 255 | 255 | 255 | 255 | 255 | 128 | 0 | 0 |
| F3 | 0 | 0 | 0 | 128 | 255 | 255 | 255 | 255 | 255 | 255 | 128 | 0 | 0 | 0 |
| R3 | 0 | 0 | 0 | 0 | 128 | 255 | 255 | 255 | 255 | 255 | 255 | 128 | 0 | 0 |
| F4 | 0 | 0 | 0 | 128 | 255 | 255 | 255 | 255 | 255 | 255 | 128 | 0 | 0 | 0 |
| R4 | 0 | 0 | 0 | 0 | 128 | 255 | 255 | 255 | 255 | 255 | 255 | 128 | 0 | 0 |

S = +0.5

|    | | | | | | | | | | | | | | |
|----|---|---|---|---|---|---|---|---|---|---|---|---|---|---|
| F1 | 0 | 0 | 0 | 64 | 255 | 255 | 255 | 255 | 255 | 255 | 192 | 0 | 0 | 0 |
| R1 | 0 | 0 | 0 | 0 | 192 | 255 | 255 | 255 | 255 | 255 | 255 | 64 | 0 | 0 |
| F2 | 0 | 0 | 0 | 64 | 255 | 255 | 255 | 255 | 255 | 255 | 192 | 0 | 0 | 0 |
| R2 | 0 | 0 | 0 | 0 | 192 | 255 | 255 | 255 | 255 | 255 | 255 | 64 | 0 | 0 |
| F3 | 0 | 0 | 0 | 64 | 255 | 255 | 255 | 255 | 255 | 255 | 192 | 0 | 0 | 0 |
| R3 | 0 | 0 | 0 | 0 | 192 | 255 | 255 | 255 | 255 | 255 | 255 | 64 | 0 | 0 |
| F4 | 0 | 0 | 0 | 64 | 255 | 255 | 255 | 255 | 255 | 255 | 192 | 0 | 0 | 0 |
| R4 | 0 | 0 | 0 | 0 | 192 | 255 | 255 | 255 | 255 | 255 | 255 | 64 | 0 | 0 |

S = 0

S = +1

S = +0.5 k, h = 0 k = +1/16 (FORWARD/REVERSE)

h = +1/16 (FORWARD)

h = +1/16 (REVERSE)

FIG. 17 (A)
s = 0, k = 0, h = 0

MAa:
| | * | 2 | 1 | |
|---|---|---|---|---|
| 0 | 1 | 2 | 1 | 0 |
| 0 | 0 | 1 | 0 | 0 |

MAb:
| 1 | 2 | * | | |
|---|---|---|---|---|
| 0 | 1 | 2 | 1 | 0 |
| 0 | 0 | 1 | 0 | 0 |

MHa:
| | * | 32 | 16 | |
|---|---|---|---|---|
| 0 | 0 | 16 | 32 | 16 |
| 0 | 1 | 15 | 0 | 0 |

MHb:
| 16 | 32 | * | | |
|---|---|---|---|---|
| 1 | 17 | 31 | 15 | 0 |
| 0 | 1 | 15 | 0 | 0 |

MJa:
| | * | 32 | 16 | |
|---|---|---|---|---|
| 0 | 16 | 32 | 16 | 0 |
| 1 | 15 | 0 | 0 | 0 |

MJb:
| 16 | 32 | * | | |
|---|---|---|---|---|
| 1 | 17 | 31 | 15 | 0 |
| 0 | 0 | 0 | 15 | 1 |

MJc:
| | * | 32 | 16 | |
|---|---|---|---|---|
| 0 | 14 | 30 | 18 | 2 |
| 1 | 15 | 0 | 0 | 0 |

MJd:
| 16 | 32 | * | | |
|---|---|---|---|---|
| 3 | 19 | 29 | 13 | 0 |
| 0 | 0 | 0 | 15 | 1 |

→ Dy
↓ Dx

FIG. 20 (A)
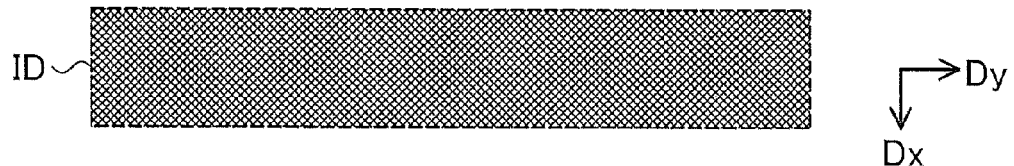
FIG. 20 (B)
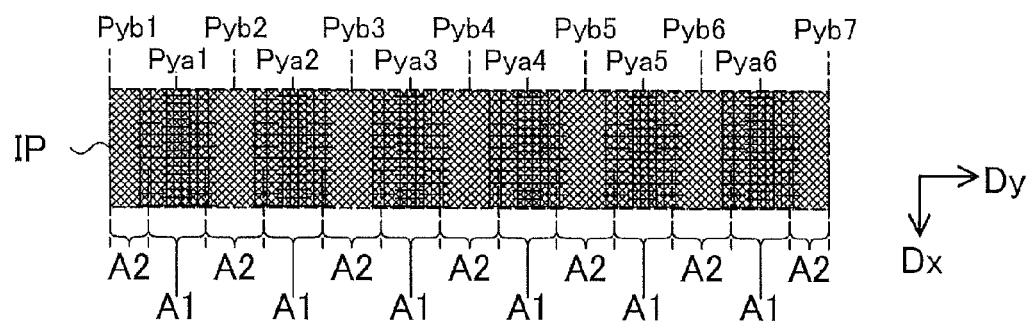
FIG. 20 (C)
| POSITION IN MAIN SCANNING DIRECTION | Pyb1 | Pya1 | Pyb2 | Pya2 | Pyb3 | | Pyb6 | Pya6 | Pyb7 |
|---|---|---|---|---|---|---|---|---|---|
| REFERENCE CALIBRATION COEFFICIENT Pref | 0.0 | 1.0 | 0.0 | 1.0 | 0.0 | | 0.0 | 1.0 | 0.0 |
FIG. 20 (D)
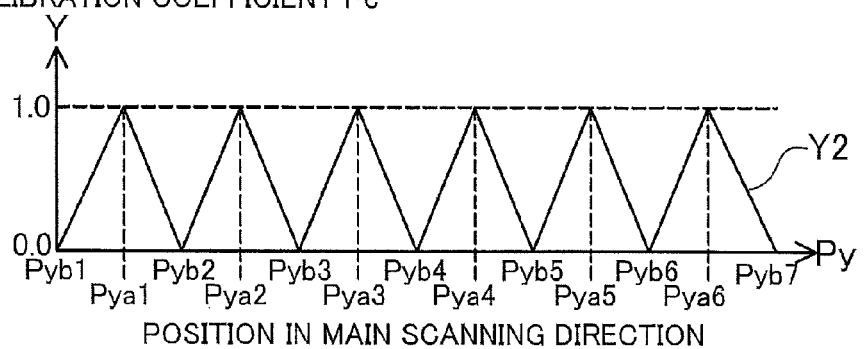

MKa:
| 0 | 0 | 1 | 0 | 0 | —LM3 |
| 0 | 1→ | 2→ | 1→ | 0 | —LM2 |
| 1 | 2 | * |   |   | —LM1 |

MKb:
| 0 | 0 | 1 | 0 | 0 | —LM3 |
| 0← | 1← | 2← | 1 | 0 | —LM2 |
|   |   | * | 2 | 1 | —LM1 |

MLa:
| 0 | 0 | 1 | 0 | 0 | —LM3 |
| 0 | 0 | 1 | 2 | 1 | —LM2 |
| 1 | 2 | * |   |   | —LM1 |

MLb:
| 0 | 0 | 1 | 0 | 0 | —LM3 |
| 1 | 2 | 1 | 0 | 0 | —LM2 |
|   |   | * | 2 | 1 | —LM1 |

MMa:
| 0 | 0 | 2 | 0 | 0 | —LM3 |
| 0 | 1 | 3 | 3 | 1 | —LM2 |
| 2 | 4 | * |   |   | —LM1 |

MNb:
| 0 | 0 | 2 | 0 | 0 | —LM3 |
| 1 | 3 | 3 | 1 | 0 | —LM2 |
|   |   | * | 4 | 2 | —LM1 |

MNa:
| 0 | 0 | 14 | 2 | 0 | —LM3 |
| 0 | 15 | 31 | 17 | 1 | —LM2 |
| 16 | 32 | * |   |   | —LM1 |

MNb:
| 0 | 0 | 14 | 2 | 0 | —LM3 |
| 0 | 15 | 31 | 17 | 1 | —LM2 |
|   |   | * | 32 | 16 | —LM1 |

→Dy
↓
Dx

Pcb: CALIBRATION COEFFICIENT VALUE FOR TWO-WAY OFFSET
Pcg: CALIBRATION COEFFICIENT VALUE FOR HEAD SKEW OFFSET

Pc = Pcb

Pc = Pcg

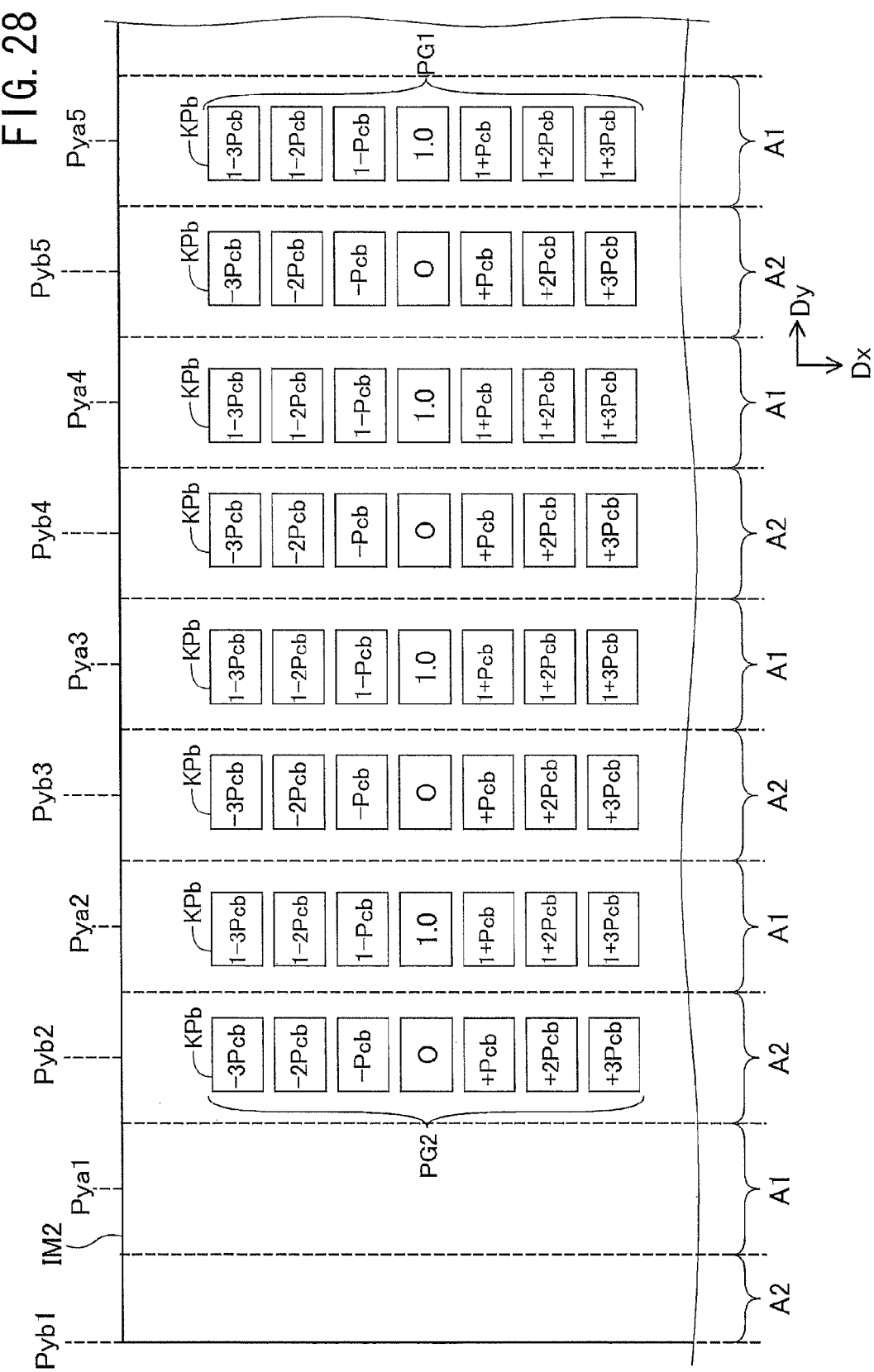

PRINT CONTROL DEVICE CAPABLE OF GENERATING IMAGE DATA USING PLURALITY OF ERROR MATRICES

CROSS REFERENCE TO RELATED APPLICATION

This application claims priority from Japanese Patent Application No. 2011-286946 filed Dec. 27, 2011. The entire content of the priority application is incorporated herein by reference.

TECHNICAL FIELD

The present invention relates to a print control device.

BACKGROUND

An inkjet printing device known in the art prints images by executing main scans (called "passes") to move a print head over a sheet of paper in a main scanning direction while ejecting ink droplets from the print head onto the paper to form dots (printed pixels). Also known in the art are laser printers that irradiate a laser beam onto a photosensitive drum to form an electrostatic latent image for each main scan line following the main scanning direction of the laser beam, and that transfers toner deposited in the electrostatic latent image onto a printing medium. In either type of printing device, the quality of the printed image can suffer when the positions of the printed pixels (the pixel positions on the printing medium) deviate from the intended positions. To prevent this type of drop in image quality, a technology has been proposed for an inkjet printing device in which a plurality of evaluation images is printed while varying the timing at which ink droplets are ejected during main scans.

SUMMARY

However, in some cases, this technology is not capable of forming evaluation images by which the quality of the printed image can be sufficiently assessed. That is, the conventional printing device may not be able to create suitable evaluation images when the ejection timing cannot be adjusted with sufficient precision for such printing criteria as main scanning speed and printing resolution. This problem is shared with laser printers, as well. That is, the conventional laser printer may not be able to create suitable evaluation images when the printer cannot adjust the exposure timing of the laser beam with sufficient precision.

In view of the foregoing, it is an object of the present invention to provide a new technique for evaluating changes in printing quality in a printing device caused by deviations in pixels positions on the printing medium.

In order to attain the above and other objects, the present invention provides a print control device for controlling a printing unit to form an image on a printing medium. The print control device includes a processor. The processor is configured to: acquire image data configured of a plurality of sets of pixel data each having a gradation value, each gradation value being represented by a first number of levels of gradation; acquire a plurality of error matrices including a first error matrix and a second error matrix different from the first error matrix; and generate print image data representing an image by performing a halftone process on the image data using the plurality of error matrices to convert each gradation value in the image data into a set of dot data, each set of dot data representing one of a second number of types of dot formation, the second number being smaller than the first number, the image including a first line and a second line parallel to the first line, the first line including a plurality of first pixels that are arranged in a main scanning direction of the printing unit and are to be printed in a forward direction, the second line including a plurality of second pixels that are arranged in the main scanning direction and are to be printed in a reverse direction opposite to the forward direction, a set of pixel data corresponding to one of the plurality of first pixels being generated by performing the halftone process using the first error matrix, a set of pixel data corresponding to one of the plurality of second pixels being generated by performing the halftone process using the second error matrix.

According to another aspect, the present invention provides a print control device for controlling a printing unit to form an image on a printing medium. The print control device includes a processor. The processor is configured to: acquire image data configured of a plurality of sets of pixel data each having a gradation value, each gradation value being represented by a first number of levels of gradation; acquire a plurality of error matrices including a first error matrix and a second error matrix different from the first error matrix; and generate print image data representing an image by performing a halftone process on the image data using the plurality of error matrices to convert each gradation value in the image data into a set of dot data, each set of dot data representing one of a second number of types of dot formation, the second number being smaller than the first number, the image including a first region and a second region arranged in a main scanning direction of the printing unit, the first region including a plurality of first pixels, the second region including a plurality of second pixels; a set of pixel data corresponding to one of the plurality of first pixels being generated by performing the halftone process using the first error matrix, a set of pixel data corresponding to one of the plurality of second pixels being generated by performing the halftone process using the second error matrix.

According to another aspect, the invention provides a print control device for controlling a printing unit to form a dot on a printing medium. The print control device includes a processor. The processor is configured to: acquire test image data configured of a plurality of sets of test pixel data each having a gradation value, each gradation value being represented by a first number of levels of gradation, the plurality of sets of test pixel data including target pixel data; acquire a plurality of error matrices including a first error matrix and a second error matrix different from the first error matrix, the first error matrix being used when an offset amount is a first offset amount, the second error matrix being used when the offset amount is a second offset amount different from the first offset amount, the offset amount being a distance between a first position and a second position in a predetermined direction, the first position at which a dot corresponding to the target pixel data is to be disposed and being determined based on the test image data, the second position at which a dot corresponding to the target pixel data is formed on the printing medium; and generating evaluation image data representing a plurality of evaluation images by performing a halftone process on the test image data using the plurality of error matrices to convert each gradation value in the test image data into a set of dot data, the plurality of evaluation images corresponding to the plurality of error matrices, respectively, each set of dot data representing one of a second number of types of dot formation, the second number being smaller than the first number.

According to another aspect, the present invention provides a non-transitory computer readable storage medium storing a set of program instructions installed on and executed by a computer for controlling a print control device. The program instructions include: acquiring image data configured of a plurality of sets of pixel data each having a gradation value, each gradation value being represented by a first number of levels of gradation; acquiring a plurality of error matrices including a first error matrix and a second error matrix different from the first error matrix; and generating print image data representing an image by performing a halftone process on the image data using the plurality of error matrices to convert each gradation value in the image data into a set of dot data, each set of dot data representing one of a second number of types of dot formation, the second number being smaller than the first number, the image including a first line and a second line parallel to the first line, the first line including a plurality of first pixels that are arranged in a main scanning direction of the printing unit and are to be printed in a forward direction, the second line including a plurality of second pixels that are arranged in the main scanning direction and are to be printed in a reverse direction opposite to the forward direction, a set of pixel data corresponding to one of the plurality of first pixels being generated by performing the halftone process using the first error matrix, a set of pixel data corresponding to one of the plurality of second pixels being generated by performing the halftone process using the second error matrix.

According to another aspect, the present invention provides a non-transitory computer readable storage medium storing a set of program instructions installed on and executed by a computer for controlling a print control device. The program instructions include: acquiring image data configured of a plurality of sets of pixel data each having a gradation value, each gradation value being represented by a first number of levels of gradation; acquiring a plurality of error matrices including a first error matrix and a second error matrix different from the first error matrix; and generating print image data representing an image by performing a halftone process on the image data using the plurality of error matrices to convert each gradation value in the image data into a set of dot data, each set of dot data representing one of a second number of types of dot formation, the second number being smaller than the first number, the image including a first region and a second region arranged in a main scanning direction of the printing unit, the first region including a plurality of first pixels, the second region including a plurality of second pixels, a set of pixel data corresponding to one of the plurality of first pixels being generated by performing the halftone process using the first error matrix, a set of pixel data corresponding to one of the plurality of second pixels being generated by performing the halftone process using the second error matrix.

According to another aspect, the present invention provides a non-transitory computer readable storage medium storing a set of program instructions installed on and executed by a computer for controlling a print control device. The program instructions include: acquiring test image data configured of a plurality of sets of test pixel data each having a gradation value, each gradation value being represented by a first number of levels of gradation, the plurality of sets of test pixel data including target pixel data; acquiring a plurality of error matrices including a first error matrix and a second error matrix different from the first error matrix, the first error matrix being used when an offset amount is a first offset amount, the second error matrix being used when the offset amount is a second offset amount different from the first offset amount, the offset amount being a distance between a first position and a second position in a predetermined direction, the first position at which a dot corresponding to the target pixel data is to be disposed and being determined based on the test image data, the second position at which a dot corresponding to the target pixel data is formed on a printing medium; and generating evaluation image data representing a plurality of evaluation images by performing a halftone process on the test image data using the plurality of error matrices to convert each gradation value in the test image data into a set of dot data, the plurality of evaluation images corresponding to the plurality of error matrices, respectively, each set of dot data representing one of a second number of types of dot formation, the second number being smaller than the first number.

BRIEF DESCRIPTION OF THE DRAWINGS

The particular features and advantages of the invention as well as other objects will become apparent from the following description taken in connection with the accompanying drawings, in which:

FIGS. 8(A)-8(D) show sample error matrices used when the two-way offset occurs;

FIGS. 17(A)-17(C) show sample error matrices used when the compound offset is generated;

FIG. 20(A) shows an example of target image data representing an image to be printed in the fourth embodiment;

FIG. 20(B) shows an example of printed image obtained by printing the target image data shown in FIG. 20(A);

FIG. 20(C) is a table indicating relationships between reference calibration coefficients and positions on the recording medium in the main scanning direction;

FIG. 20(D) is a graph indicating relationships between calibration coefficients and the positions on the recording medium in the main scanning direction;

FIGS. 22(A)-22(C) and 23 show sample error matrices used in the fifth embodiment;

FIG. 28 is an explanatory diagram showing an example of evaluation images in a seventh embodiment of the present invention.

DETAILED DESCRIPTION

A. First Embodiment

A-1: Structure of a Multifunction Peripheral 600

Figure 1:
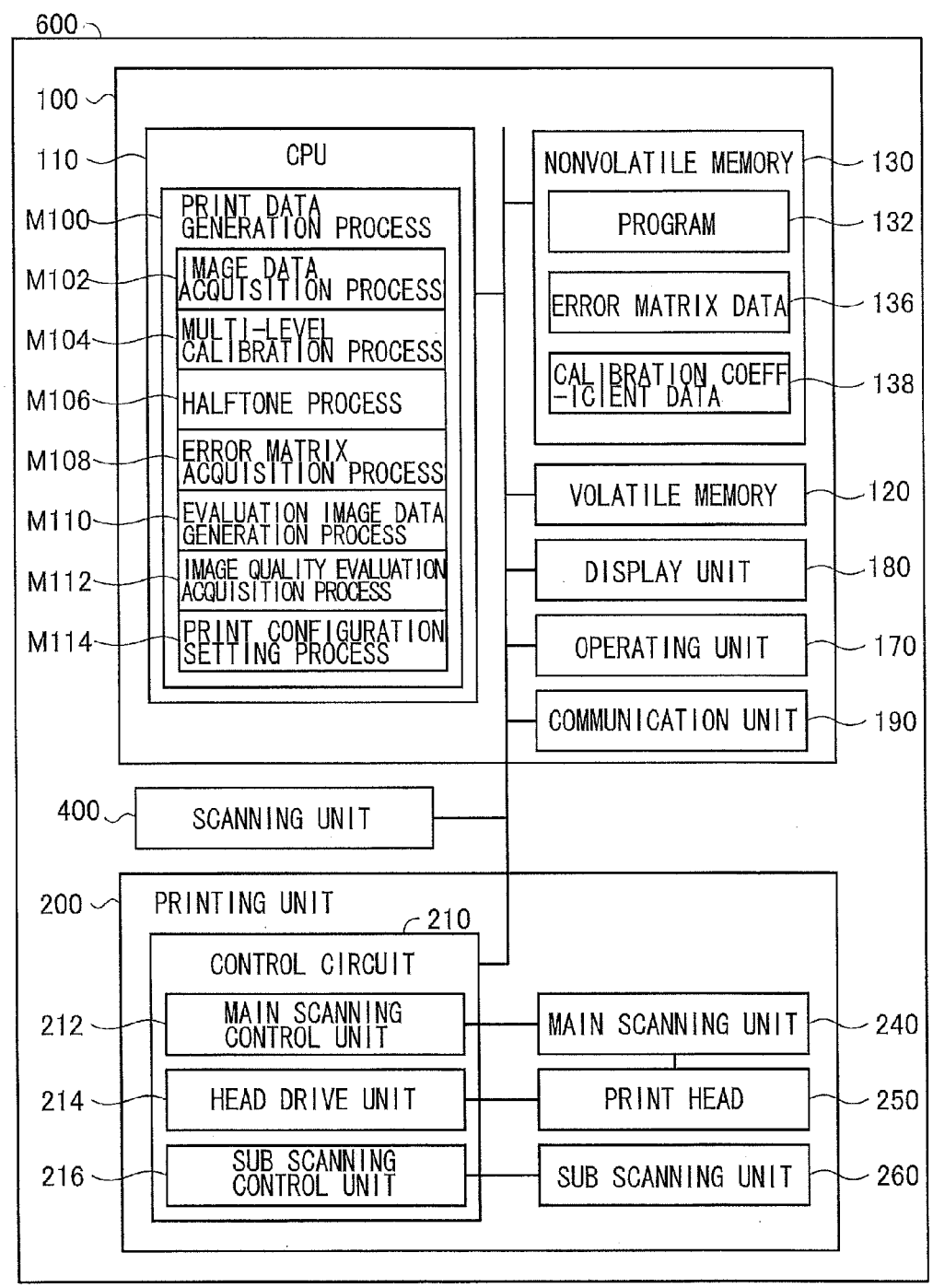
FIG. 1 is a block diagram of a multifunction peripheral according to a first embodiment of the present invention.

Next, preferred embodiments of the present invention will be described while referring to the accompanying drawings. FIG. 1 is a block diagram of a multifunction peripheral (MFP) 600 according to a first embodiment of the present invention. The MFP 600 includes a control unit 100, a printing unit 200, and a scanning unit 400.

The control unit 100 is a computer for controlling operations of the MFP 600. The control unit 100 includes a CPU 110; a volatile memory 120, such as DRAM; a nonvolatile memory 130, such as EEPROM; an operating unit 170, such as a touchscreen; a display unit 180, such as a liquid crystal display; and a communication unit 190 constituting an interface for communicating with external devices. The communication unit 190 may be a USB interface or an interface conforming to IEEE 802.3, for example.

The nonvolatile memory 130 stores a program 132, error matrix data 136 defining an error matrix, and calibration coefficient data 138 defining an offset calibration coefficient Pc described later. The CPU 110 executes the program 132 to implement various functions, including the functions performing a print data generation process M100.

In the print data generation process M100, the CPU 110 controls the printing unit 200 to print an image based on image data representing the image to be printed (hereinafter referred to as "target image data"). The target image data may be image data supplied to the MFP 600 from an external device (such as a computer or USB flash memory), for example.

In the first embodiment, the print data generation process M100 includes an image data acquisition process M102, a multi-level calibration process M104, a halftone process M106, and an error matrix acquisition process M108. The print data generation process M100 may also include an evaluation image data generation process M110, an image quality evaluation acquisition process M112, and a print configuration setting process M114. These processes will be described later.

The scanning unit 400 includes a photoelectric conversion element, such as a charge-coupled device (CCD), for receiving light transmitted through or reflected off an object (an original), and for generating image data representing the object (scan data).

The printing unit 200 ejects ink droplets toward a printing medium to form ink dots on the medium. The printing unit 200 includes a control circuit 210, a print head 250, a main scanning unit 240, and a sub-scanning unit 260.

Figure 2A:
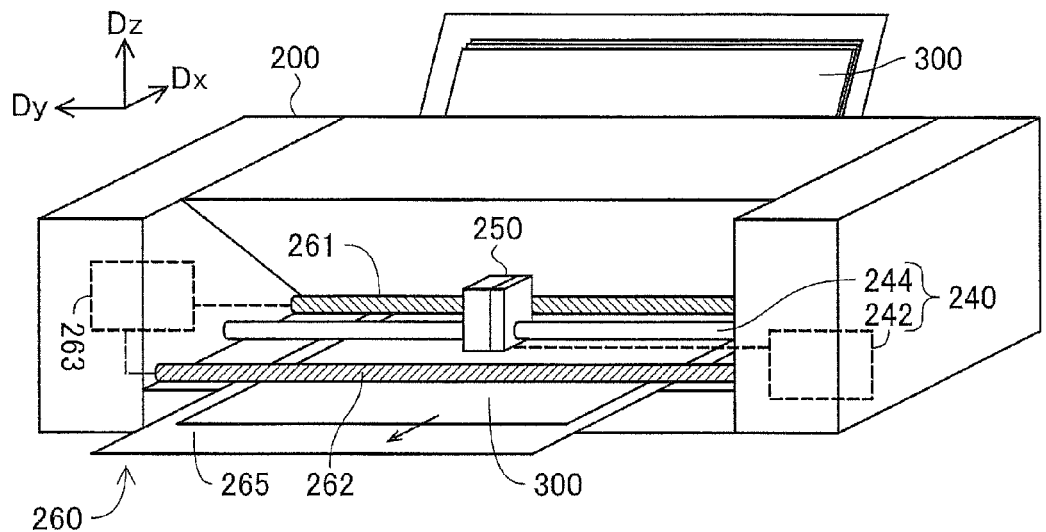
FIG. 2(A) is a perspective view of a printing unit of the multifunction peripheral shown in FIG. 1.
Figure 2B:
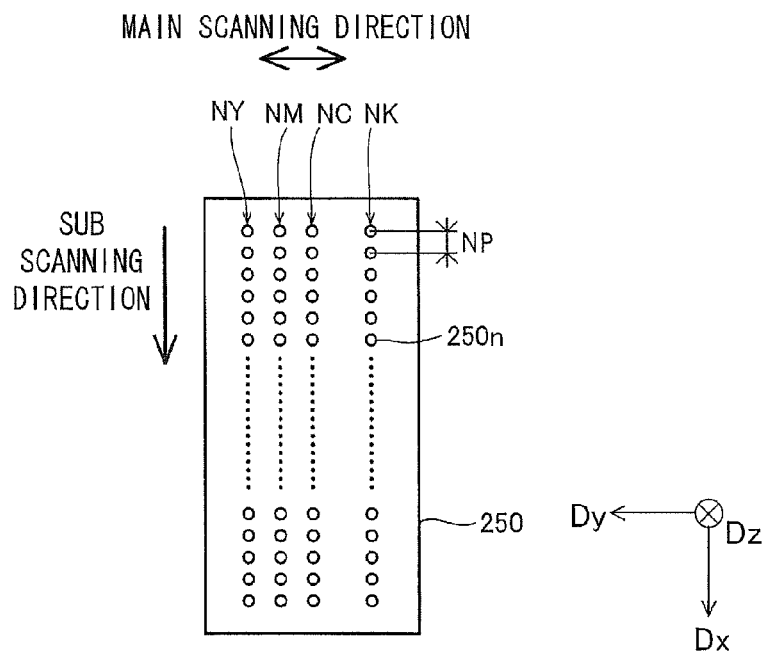
FIG. 2(B) is a bottom view of print head of the printing unit shown in FIG. 2(A)

The printing unit 200 will be further described with reference to FIG. 2 in addition to FIG. 1. FIG. 2(A) is a perspective view conceptually illustrating the structure of the printing unit 200 in the MFP 600. FIG. 2(B) shows the configuration of a nozzle-forming surface on the print head 250. Three directions Dx, Dy, and Dz are indicated in FIGS. 2(A) and 2(B). The two directions Dx and Dy are horizontal, while the Dz direction is vertical. Dx and Dy directions are orthogonal to each other. Hereinafter, the Dx direction will be called the "+Dx direction," and the direction opposite the Dx direction will be called the "−Dx direction." The same notation will be used for the "+Dy direction," "−Dy direction," "+Dz direction," and "−Dz direction."

The sub-scanning unit 260 executes a sub scan for conveying a printing medium 300 (a sheet of paper of A3 or A4 size, for example) in the −Dx direction. As a result, the print head 250 moves in the +Dx direction relative to the printing medium 300. Hereinafter, the +Dx direction will also be referred to as "the sub-scanning direction."

The sub-scanning unit 260 more specifically includes a conveying motor 263, a first roller 261, a second roller 262, and a platen 265. The platen 265 supports the bottom surface of the printing medium 300 to maintain the printing medium 300 in a horizontal state. The two rollers 261 and 262 are positioned in opposition to the top surface of the platen 265. The first roller 261 opposes a portion of the platen 265 on the +Dx side of the print head 250, while the second roller 262 opposes a portion of the platen 265 on the −Dx side of the print head 250. The rollers 261 and 262 are arranged parallel and aligned in the Dy direction. The conveying motor 263 drives the rollers 261 and 262 to rotate. The rollers 261 and 262 convey the printing medium 300 in the −Dx direction while the printing medium 300 is interposed between the rollers 261 and 262 and the platen 265.

The main scanning unit 240 executes a main scan for reciprocating the print head 250 in directions orthogonal to the sub-scanning direction (the +Dy and −Dy directions). In the following description, both the +Dy direction and −Dy direction will be called the "main scanning direction," and the +Dy direction will be differentiated as the "forward direction," while the −Dy direction will be called the "reverse direction."

The main scanning unit 240 more specifically includes a motor 242, and a support shaft 244. The support shaft 244 is disposed between the rollers 261 and 262 and is oriented in the main scanning direction. The support shaft 244 slidably supports the print head 250 so that the print head 250 can move along the support shaft 244. The motor 242 is connected to the print head 250 by a belt (not shown) for supplying a drive force for a main scan.

As shown in FIG. 2(B), a plurality of nozzle rows NC, NM, NY, and NK is provided in the surface of the print head 250 opposing the printing medium 300. The nozzle rows NC, NM, NY, and NK respectively eject ink droplets in one of the four colors used for printing (cyan (C), magenta (M), yellow (Y), and black (K) in the first embodiment). Each nozzle row has a plurality (200 for example) of nozzles 250n for ejecting ink droplets of the same color to form dots on the printing medium 300. A piezoelectric element (not shown) is provided for each nozzle 250n in order to drive the nozzle 250n to eject ink. The nozzles 250n in each nozzle row are aligned in the sub-scanning direction at a nozzle pitch NP. Although the nozzles are arranged linearly in the example of FIG. 2(B), the nozzles may be staggered instead. For simplification, the depiction of the print head 250 in FIGS. 3(A) and 3(B) and subsequent drawings will be simplified and shown to include only a few (four, for example) nozzles 250n for ejecting only one color of ink.

The control circuit 210 includes a main scan control unit 212 for controlling the main scanning unit 240, a head drive unit 214 for driving the print head 250 to eject ink from nozzles 250n, and a sub scan control unit 216 for controlling the sub-scanning unit 260. The control circuit 210 executes a printing operation by controlling the main scanning unit 240, print head 250, and sub-scanning unit 260 according to print data supplied from the control unit 100. More specifically, the control circuit 210 repeatedly and alternately executes a unit print and a unit sub scan to print an image. A "unit print" is a printing operation performed by driving the print head 250 to eject ink during a main scan while the printing medium 300 is halted. A single main scan corresponding to a single unit print is also called a "pass." Of these unit prints, the control circuit 210 is capable of executing a forward print by printing during a main scan in the forward direction (hereinafter also called a "forward pass"), and a reverse print for printing during a main scan in the reverse direction (hereinafter also called a "reverse pass"). A "unit sub scan" is performed by conveying the printing medium 300 in the sub-scanning direction a prescribed unit conveying distance.

Figure 3A:
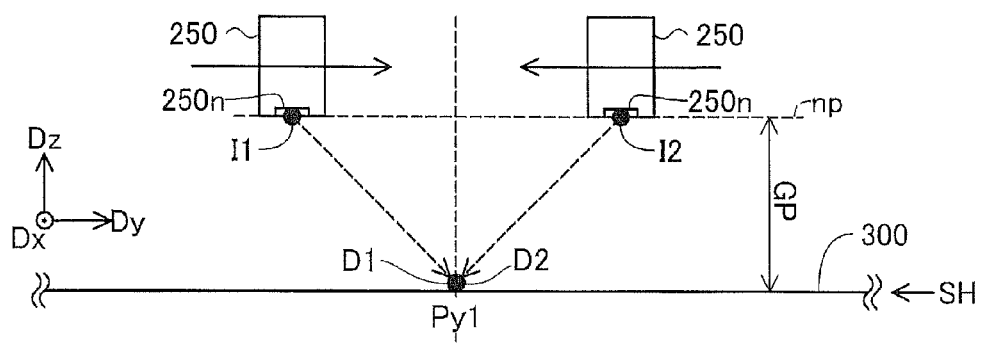
FIG. 3(A) is an explanatory diagram illustrating an ideal case in which ink droplets impact a printing medium at a desired position.
Figure 3B:
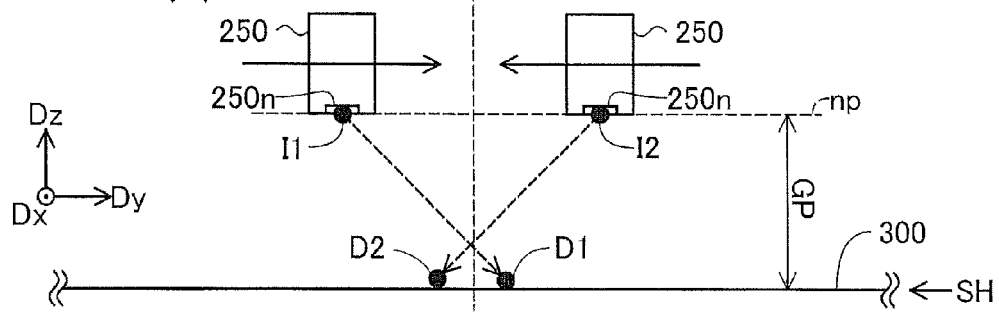
FIG. 3(B) is an explanatory diagram illustrating a case in which ink droplets impact the printing medium at a position offset from the desired position.

FIGS. 3(A) and 3(B) illustrate the impact positions on a sheet of the printing medium 300 of ink droplets I1 and I2 ejected from the print head 250. The first ink droplet I1 is ejected during a forward pass, while the second ink droplet I2 is ejected during a reverse pass.

FIG. 3(A) illustrates the ideal case in which both the first and second ink droplets I1 and I2 impact the printing medium 300 at a desired position Py1. If the timing for ejecting one of the ink droplets in at least one of the forward and reverse passes is off the ideal timing, the impact position (dot-forming position) of the first ink droplet I1 will be offset relative to the impact position of the second ink droplet I2. Positional offset between a dot D1 printed in a forward pass and a dot D2 printed in a reverse pass will be called "two-way offset" in the following description.

FIG. 3(B) shows an example for comparison with the ideal example of FIG. 3(A) in which the ink ejection timing is late. In this example, the impact position of the first ink droplet I1 is offset in the forward direction from the desired position Py1, while the impact position of the second ink droplet I2 is offset in the reverse direction from the desired position Py1. Therefore, the dot D2 (pixel) formed in a reverse raster line, i.e., a raster line (main scan line) printed in a reverse pass, is offset in the reverse direction from the dot D1 formed in a forward raster line, i.e., a raster line printed in a forward pass. Hence, the dot D1 in the forward raster line is offset in the forward direction from the dot D2 in the reverse raster line. Hereinafter, two-way offset in these directions will be called "positive two-way offset."

In contrast to the example in FIG. 3(B), if the ink ejection timing is earlier than the example in FIG. 3(A) for both the forward pass and the reverse pass, the dot D2 in the reverse raster line is offset in the forward direction from the dot D1 in the forward raster line. Hence, the dot D1 in the forward raster line is offset in the reverse direction from the dot D2 in the reverse raster line. Hereinafter, two-way offset in these directions will be called "negative two-way offset."

FIGS. 3(A) and 3(B) illustrate a gap GP between a nozzle surface np of the print head 250 and the printing medium 300. The nozzle surface np is a plane passing through the positions of the nozzles 250n and passing through positions in which the nozzles 250n can move. The gap GP is the distance between the nozzle surface np and the printing medium 300.

This offset between dots described above (also referred to as pixel offset) can reduce the quality of the printed image. Generally an image is printed by forming a plurality of dots in positions separated from one another. However, pixel offset can cause some dots to be formed closer to other dots than intended or even to overlap other dots. As a consequence, the printed image will appear coarser than when there is no pixel offset. That is, the pattern of dots representing the printed image can appear grainy due to pixel offset, resulting in a poorer quality image. In order to suppress a drop in image quality caused by pixel offset, the CPU 110 performs a halftone process using a special error matrix in the print data generation process M100 described later.

A-2: Overview of a Printing Process

Figure 4:
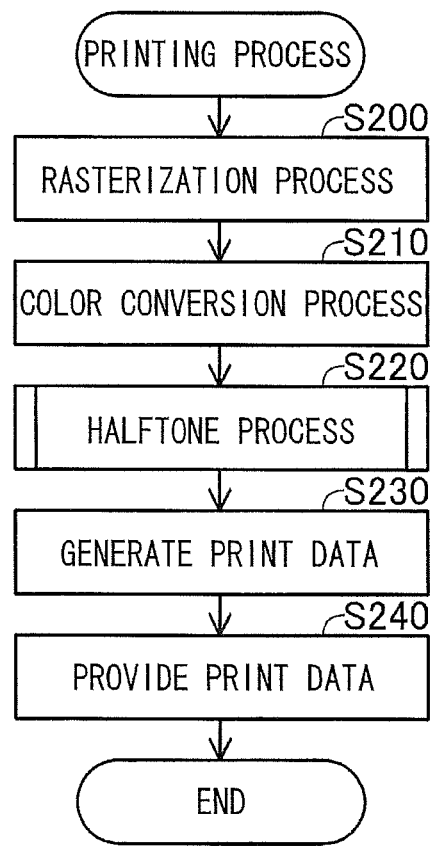
FIG. 4 is a flowchart illustrating steps in a printing process executed by the multifunction peripheral.

FIG. 4 is a flowchart illustrating steps in a printing process executed by the MFP 600. The CPU 110 begins the printing process in response to a user command (for example, an operation issued by the user on the operating unit 170 or a command received by a computer (not shown) connected to the communication unit 190). The CPU 110 acquires target image data for an image to be printed from an external device connected to the communication unit 190.

In S200 the CPU 110 converts the target image data to bitmap data BD (rasterization process). The pixel data constituting the bitmap data BD is RGB pixel data expressing pixel colors in gradation values (256 levels from 0 to 255, for example) for each of the three color components red (R), green (G), and blue (B), for example. In the first embodiment, the resolution of the bitmap data BD is identical to the printing resolution (dot-recording resolution).

In S210 the CPU 110 converts the RGB pixel data constituting the bitmap data BD to CMYK pixel data representing the colors of pixels in gradation values (component values) for four color components (cyan (C), magenta (M), yellow (Y), and black (K)) corresponding to the ink colors used in the printing unit 200 (color conversion process). The color conversion process is performed using a lookup table with correlations between RGB pixel data and CMYK pixel data. The number of gradations for each component in the CMYK pixel data is larger (256 levels from 0 to 255, for example) than the number of types of dot formation states (four in the first embodiment; described later in greater detail).

In S220 the CPU 110 executes the halftone process M106. The halftone process M106 serves to convert the CMYK pixel data constituting the bitmap data BD to dot data (printed pixel values) representing the formation states of dots (printed pixels) for each pixel. The CPU 110 executes the halftone process M106 according to an error diffusion method using an error matrix. The process in S220 will be described later in greater detail.

In S230 the CPU 110 executes the print data generation process M100 to generate print data from the dot data. Print data is data in a format that the printing unit 200 can interpret. In the print data generation process M100, the CPU 110 generates print data by rearranging the dot data in an order used for printing based on the printing method (e.g., two-way interlaced printing described later) and by adding various printer control codes, data identification codes, and the like.

In S240 the CPU 110 provides the print data to the printing unit 200. The printing unit 200 prints an image based on the print data received from the CPU 110.

A-3: Halftone Process

Figure 5:
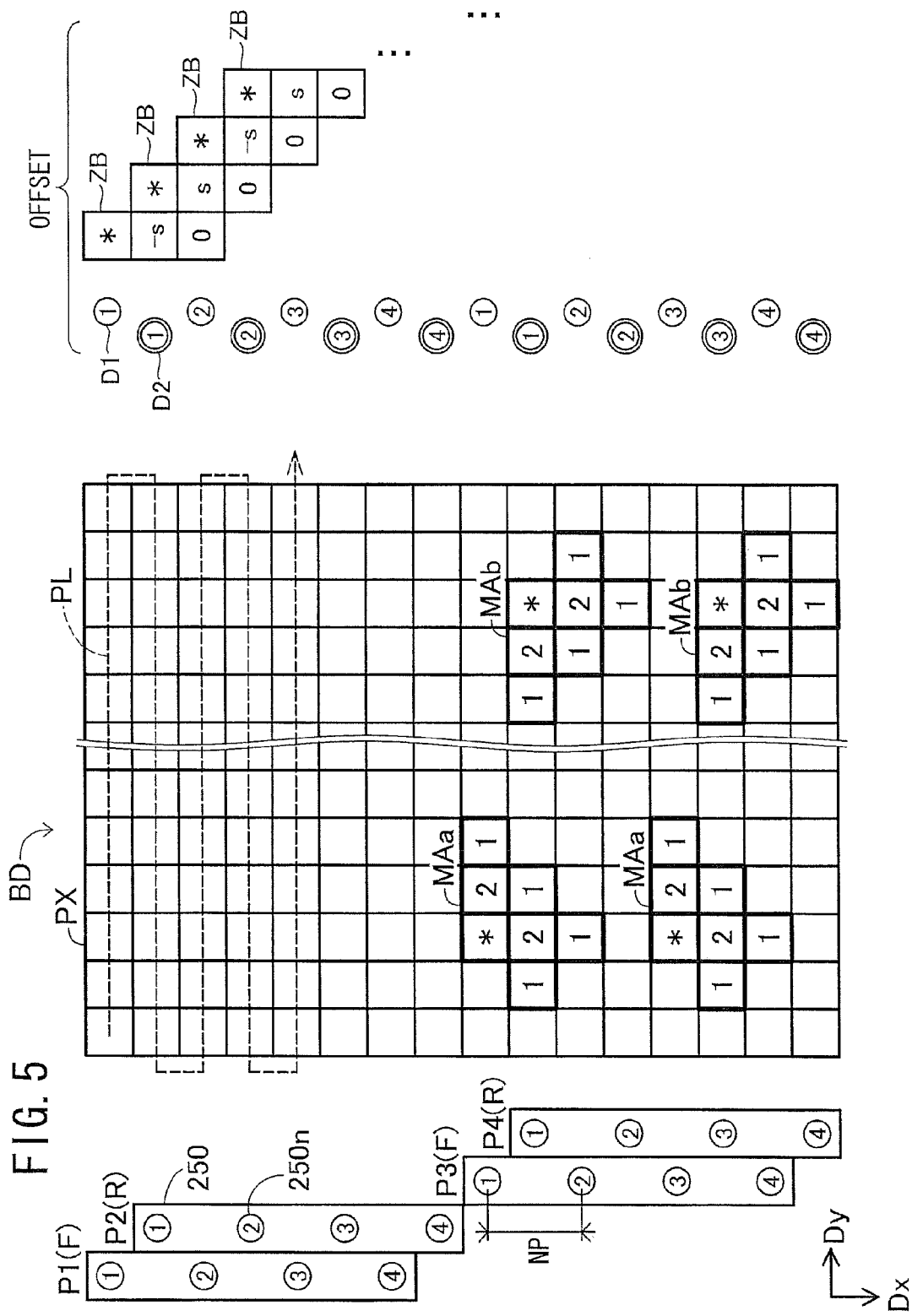
FIG. 5 is an explanatory diagram illustrating a two-way offset during two-way interlaced printing.

The error matrix used in the halftone process of the first embodiment may differ according to the printing method. The following example assumes the printing method is two-way interlaced printing. FIG. 5 illustrates two-way offset during two-way interlaced printing. The bitmap data BD to be processed is conceptually illustrated in the center of FIG. 5. Pixels (squares) PX represent pixels constituting the bitmap data BD. The positions of the print head 250 in the sub-scanning direction are indicated on the left side in FIG. 5 for each pass used to print the bitmap data BD. The four nozzles 250n of the print head 250 will be referred to in order from the top of FIG. 5 as the nozzles 1, 2, 3, and 4. The notation Pm is used to indicate the pass in FIG. 5, where "m" represents the order in which the pass is executed. Further, a "F" is appended to the pass Pm in FIG. 5 when the pass is a forward pass, and a "R" is appended to the pass Pm when the pass is a reverse pass.

As shown in FIG. 5, two-way interlaced printing in the first embodiment is two-pass printing at a dot pitch of half the nozzle pitch NP. In this two-way interlaced printing, odd-numbered passes are forward passes, and even-numbered passes are reverse passes. Further, a unit sub scan equivalent to the dot pitch is performed between each forward pass and the subsequent reverse pass, and a unit sub scan equivalent to the head length (four times the nozzle pitch NP in the example of FIG. 5) is performed between each reverse pass and the subsequent forward pass. As shown in FIG. 5, odd-numbered raster lines beginning from the top of the bitmap data BD are printed in forward passes, while even-numbered raster lines are printed in reverse passes.

In the following example, it will be assumed that positive two-way offset of an amount s is produced. The right side of FIG. 5 illustrates this two-way offset by showing the positional relationship between a dot D1 (depicted with a single circle) printed in a forward pass, and a dot D2 (depicted with a double circle) printed in a reverse pass. Ideally (i.e., when there is no two-way offset), these dots D1 and D2 should be aligned in the sub-scanning direction. The numeral included in each dot denotes the nozzle number used to print the dot (shown on the left side in FIG. 5). For example, the dot depicted by a "2" inside a double circle, denotes the dot printed by nozzle 2 in a reverse pass.

Boxes ZB shown in the right side of FIG. 5 represent the amount of relative pixel offset between raster lines. The boxes ZB indicate pixel offset of a first proximal raster line relative to a reference raster line and pixel offset of a second proximal raster line relative to the reference raster line. The first proximal raster line is adjacent to the reference raster line in the sub-scanning direction, while the second proximal raster line is two lines separated from the reference raster line in the sub-scanning direction (adjacent to the first proximal raster line in the sub-scanning direction). Each box ZB includes three cells. The "*" mark in the first cell represents the position of the reference line. The second cell adjacent to the first cell in the sub-scanning direction indicates the pixel offset for the first proximal raster line. The third cell adjacent to the second cell in the sub-scanning direction indicates the pixel offset of the second proximal raster line. To facilitate understanding of the boxes ZB, the pixel offset of the second proximal raster line for each raster line is "0" in this example. Thus, it is clear that pixel offset of a reverse raster line relative to a forward raster line is "−s", while pixel offset of a forward raster line relative to a reverse raster line is "s". A pixel offset of "+s" indicates that the pixel is shifted an offset amount s in the forward direction (+Dy direction). A pixel offset of "−s" indicates that the pixel is shifted an offset amount s in the reverse direction (−Dy direction).

Figure 6:
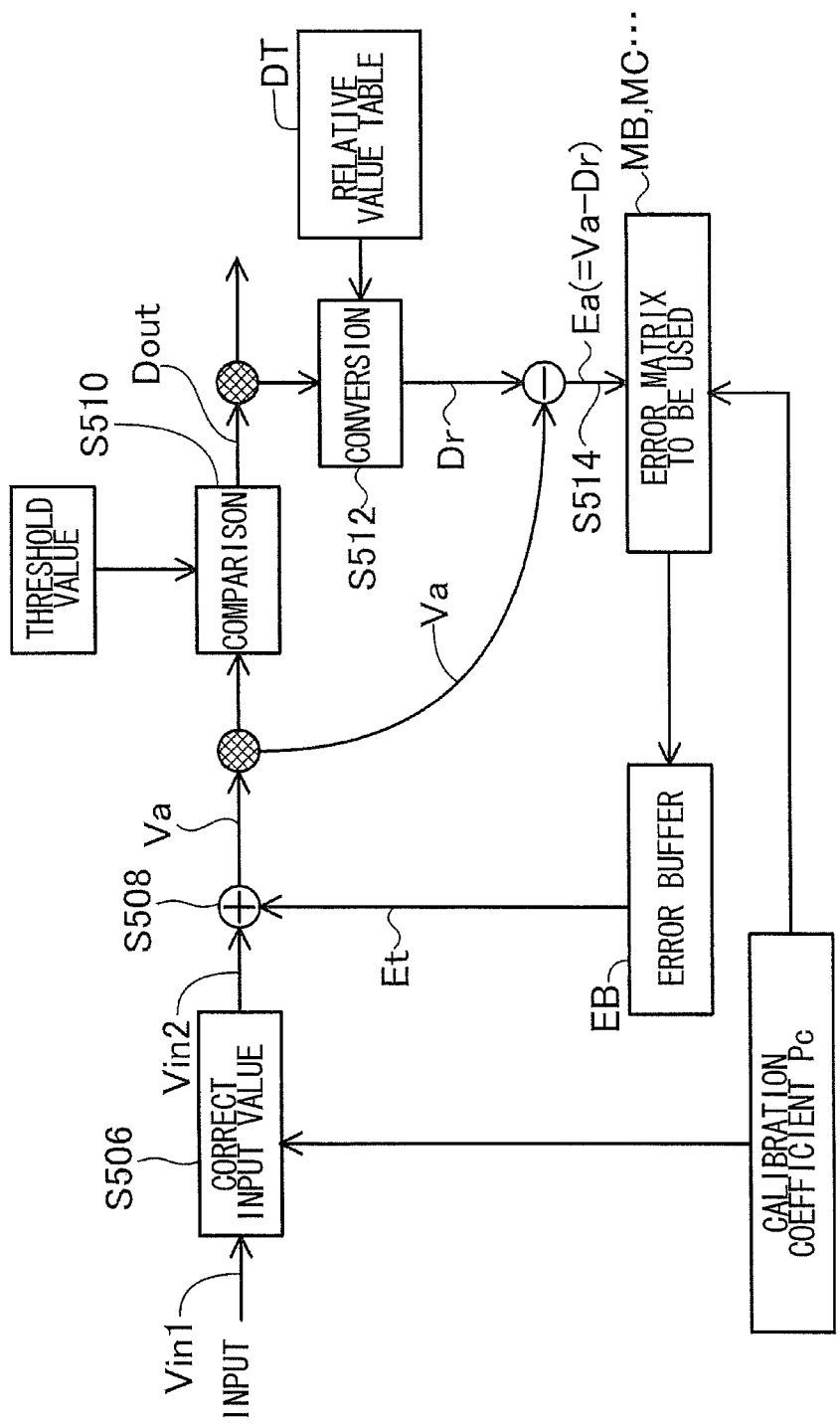
FIG. 6 is an explanatory diagram illustrating a halftone process in the printing process shown in FIG. 4.
Figure 7:
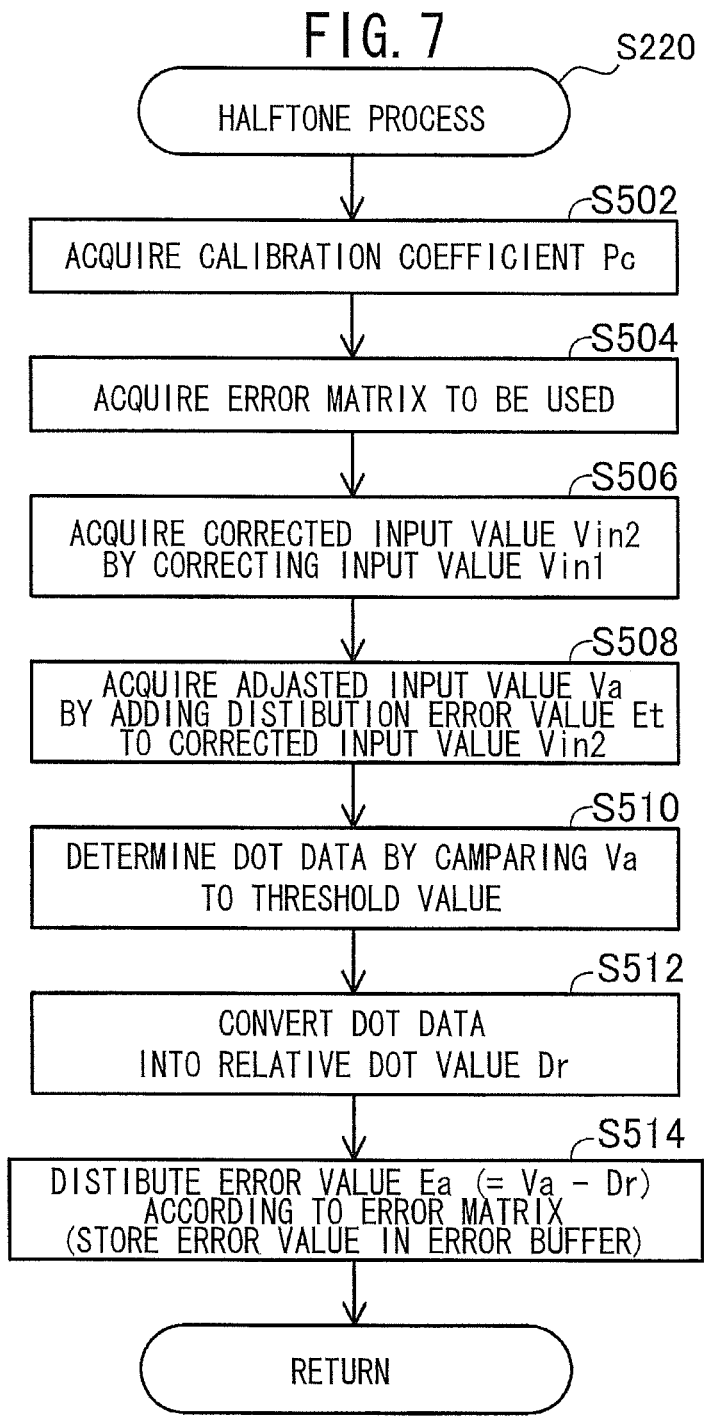
FIG. 7 is a flowchart illustrating steps in the halftone process.

FIG. 6 illustrates an overview of the halftone process. FIG. 7 is a flowchart illustrating steps in the halftone process. The halftone process of FIG. 7 is executed for each pixel and each ink color. A dashed line PL in FIG. 5 indicates the order in which pixels are processed in the halftone process for a single color of ink. In the first embodiment, the pixels PX in odd-numbered lines are processed in order in the forward direction (+Dy direction), while pixels PX in even-numbered lines are processed in order in the reverse direction (−Dy direction). Due to this processing order, an error matrix for processing in the forward direction is used for pixels PX in odd-numbered lines, while a separate error matrix for processing in the reverse direction is used for pixels PX in even-numbered lines. In general, the error matrix for the forward direction (a matrix MAa in FIG. 5, for example) is symmetrical in the main scanning direction to the error matrix for the reverse direction (a matrix MAb in FIG. 5, for example). Note that, while the processing direction for raster lines in the halftone process matches the direction of the passes for printing the same raster lines in the example of FIG. 5, this is merely a coincidence, and the two directions are unrelated. In this and subsequent embodiments, the processing direction in the halftone process (processing order) is identical regardless of the printing method (two-way printing or one-way printing, for example).

The halftone process serves to generate dot data representing the dot formation states. In the first embodiment, the dot formation states are set to one of the following four ink quantities, i.e., dot sizes (densities represented by dots).

A) Large dot
B) Medium dot (density of medium dot<density of large dot)
C) Small dot (density of small dot<density of medium dot)
D) No dot Hence, there are four levels of dot data.

In S502 the CPU 110 acquires an offset calibration coefficient Pc (hereinafter simply referred to as the "calibration coefficient Pc") for two-way offset recorded in the calibration coefficient data 138. This calibration coefficient Pc is associated with the magnitude and direction of two-way offset in the printing unit 200 described above, for example. The calibration coefficient Pc may indicate the dot pitch in the main scanning direction as units. If the calibration coefficient Pc accurately corresponds to the two-way offset described in FIG. 5, then the calibration coefficient Pc=+s. The calibration coefficient Pc may be set by measuring the actual two-way offset generated in a test image printed experimentally to identify the value of "s" described in FIG. 5. Alternatively, the calibration coefficient Pc may be set based on the results of evaluating the quality of a printed evaluation image (an evaluation of graininess, for example).

In S504 the CPU 110 executes the error matrix acquisition process M108 to acquire the error matrix to be used for error diffusion. FIGS. 8(A)-8(D) show sample error matrices used when two-way offset occurs (hereinafter called "two-way offset error matrices"). FIG. 8(A) shows reference error matrices MAa and MAb. Here, the lower case letter appended at the end of the matrix name indicates the processing direction. That is, "a" indicates an error matrix for processing in the forward direction, while "b" indicates an error matrix for processing in the reverse direction. When not differentiating between forward and reverse directions of processing in the following description, the appended letter "a" or "b" may be omitted. The reference error matrices MA are designed to achieve a desired image quality when pixel offset does not occur.

An error matrix defines the error distribution ratios for peripheral pixels within a specific range from a process target pixel. The error matrix in the first embodiment includes three line matrices LM1-LM3, as in the reference error matrix MA. The first line matrix LM1 defines the error distribution ratios for peripheral pixels in a target raster line, which is the raster line containing the process target pixel. The second line matrix LM2 defines the error distribution ratios for peripheral pixels in the first proximal raster line to the target raster line, and the third line matrix LM3 defines the error distribution ratios for peripheral pixels in the second proximal raster line to the target raster line.

In the error matrix acquisition process M108, the CPU 110 creates an error matrix for the current process by using the calibration coefficient Pc to shift a shift-target line matrix in the reference error matrix MA in the main scanning direction. A shift-target line matrix is a line matrix corresponding to a different raster line from the target raster line whose peripheral pixels are offset from the process target pixel. More specifically, the CPU 110 shifts the shift-target line matrix in order to cancel the relative offset indicated in the box ZB on the right side of FIG. 5. Thus, in the example, the shift target matrix is any of the line matrices LM2 and LM3 that correspond to raster lines that are offset relative to the process target pixel. To cancel the relative offset, the shift-target line matrix is shifted an amount equivalent to the relative offset in the direction opposite the direction of relative offset. In the example of two-way offset shown in FIG. 5, the second line matrix LM2 is the shift-target line matrix based on the boxes ZB on the right side of FIG. 5.

The direction in which the shift-target line matrix is shifted is the direction opposite the pixel offset. As described above, pixels in the reverse raster line are shifted in the reverse direction (–Dy direction) from pixels in the forward raster line when the two-way offset is positive (when the value "s" is positive in the box ZB on the right side of FIG. 5). Thus, when the process target pixel is in a forward raster line (an odd-numbered line in the preferred embodiment), the CPU 110 uses an error matrix in which the second line matrix LM2 is shifted in the forward direction (+Dy direction). Hence, in the case of positive two-way offset, pixels in a forward raster line are shifted in the forward direction (+Dy direction) from pixels in reverse raster lines. Consequently, when the process target pixel is in a reverse raster line (an even-numbered line in the first embodiment), the CPU 110 uses an error matrix in which the second line matrix LM2 is shifted in the reverse direction (–Dy direction).

It is preferable that the shift-target line matrix is shifted an amount equivalent to the pixel offset. In the first embodiment, the CPU 110 shifts the shift-target line matrix the amount "s" (see FIG. 5) of pixel offset in the error matrix acquisition process M108.

FIG. 8(B) shows error matrices MB for use when the two-way offset is +1 pixel, i.e., when s=+1. As shown in FIGS. 8(A) and 8(B), the second line matrix LM2 in the error matrix MBa is shifted one pixel in the forward direction from the second line matrix LM2 in the reference error matrix MAa (FIG. 8(A)). Similarly, the second line matrix LM2 in the error matrix MBb is shifted one pixel in the reverse direction from the second line matrix LM2 in the reference error matrix MAb (FIG. 8(A)).

FIGS. 8(A) (pre-shift) and 8(B) (post-shift) illustrate an example of shifting a shift-target line matrix when the shift amount is an integer. In this case, the shift-target line matrix is shifted by moving error distribution ratios in each pre-shift pixel to pixels positioned a distance equivalent to the integer in the shift direction (hereinafter called an "integer shift").

For two-way printing, the CPU 110 uses a combination of two error matrices (hereinafter called an "error matrix set") having opposing shift directions for shifting the shift-target line matrix. The error matrix set in the example of FIG. 8(B) is the error matrix MBa on the left side and the error matrix MBb on the right side. One of the matrices in the error matrix set (the error matrix MBa, for example) is used for printing the raster line that includes the process target pixel in a forward pass and for printing the raster line corresponding to the shift-target line matrix in a reverse pass. The other matrix in the set (the error matrix MBb, for example) is used for printing the raster line having the process target pixel in a reverse pass and for printing the raster line corresponding to the shift-target line matrix in a forward pass.

FIG. 8(C) shows error matrices MC for use when the two-way offset is +0.5 pixels, i.e., when s=+0.5. In this case, the error matrices MC are obtained by shifting the shift-target line matrix (the second line matrix LM2 in the reference error matrix MA) 0.5 pixels.

This example illustrates a shifting method (called a "fractional shift") used when the shift amount N is in the range 0<N<1. First, the CPU 110 multiplies the distribution ratio for each pixel defined in the shift-target line matrix by the shift amount N to obtain a multiplied distribution ratio and subtracts this multiplied distribution ratio from the distribution ratio of the pixel in the error matrix acquisition process M108. Next, the CPU 110 adds the multiplied distribution ratio to the distribution ratio for the pixel adjacent to the current pixel in the shift direction. Through these two processes, the CPU 110 performs a fractional shift in the shift-target line matrix.

Here, the example of calculating an error matrix MCa (FIG. 8(C)) will be described, wherein the second line matrix LM2 in the reference error matrix MAa (FIG. 8(A)) is shifted 0.5 pixels in the forward direction (+Dy direction). In this example, the shift-target line matrix prior to shifting (i.e., the second line matrix LM2 in the reference error matrix MAa) is represented by LM=(0, 1, 2, 1, 0) (FIG. 8(A)). The five components in this line matrix LM are the error distribution ratios for the peripheral pixels PX1, PX2, PX3, PX4, and PX5 indicated in FIG. 8(A). When the shift amount N=0.5, a line matrix K representing the multiplied distribution ratios=N× LM=(0, 0.5, 1, 0.5, 0). The line matrix KS obtained by moving the multiplied distribution ratios for each peripheral pixel to the pixel adjacent in the shifting direction (+Dy direction) is (0, 0, 0.5, 1, 0.5). Therefore, LMs=LM−K+KS, where LMs is the shift-target line matrix after shifting (the second line matrix LM2 in the error matrix MCa).

From this calculation, LMs=(0, 1, 2, 1, 0)−(0, 0.5, 1, 0.5, 0)+(0, 0, 0.5, 1, 0.5)=(0, 0.5, 1.5, 1.5, 0.5) (FIG. 8(C)).

Through a similar calculation, it is possible to compute the error matrix MCb by shifting the second line matrix LM2 in the reference error matrix MAb 0.5 pixels in the reverse direction (−Dy direction). Since error distribution ratios represent a percentage, these ratios have essentially the same significance when all are multiplied by the same number. Accordingly, by multiplying each error distribution ratio in both the error matrices MCa and MCb in the top of FIG. 8(C) by 2, it is possible to obtain error matrices MC2a and MC2b shown in the bottom of FIG. 8(C) that have the same significance and have error distribution ratios expressed in integers.

By performing a fractional shift according to the method described above, the CPU 110 can shift a shift-target line matrix at an arbitrary precision smaller than one pixel. In other words, the CPU 110 can obtain an error matrix for correcting pixel offset smaller than one pixel. FIG. 8(D) shows an example of error matrices MD for two-way offset of +1/16 pixels, i.e., a calibration coefficient Pc of +1/16.

More generally, when the shift amount N=N1+N2 (where N1 is an integer and N2 is a value between 0 and 1 (a fractional component)), the CPU 110 executes an integer shift of N1 on the shift-target line matrix and subsequently executes a fractional shift of N2 on the shift-target line matrix in the error matrix acquisition process M108.

Returning to FIG. 7, after acquiring the error matrix in S504, in S506 the CPU 110 performs the multi-level calibration process M104 to correct an input value Vin1 (the component value for the ink color of the process target from among the CMYK pixel data for the process target pixel) to acquire a corrected input value Vin2. The CPU 110 corrects the input value Vin1 in order to shift the raster line in the direction opposite the pixel offset. The CPU 110 uses the calibration coefficient Pc to calibrate the input value Vin1.

Figure 9A:
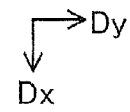
FIGS. 9(A)-9(C) are explanatory diagrams illustrating a process of calibrating input values.
Figure 9B:
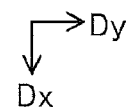
Figure 9C:
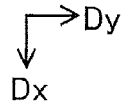

FIGS. 9(A)-9(C) are explanatory diagrams illustrating the process of calibrating input values. An input value is given for each pixel PX constituting the bitmap data BD in FIGS. 9(A)-9(C). FIG. 9(A) shows the input values prior to correction. FIG. 9(B) shows an example of corrected input values when the two-way offset is +1 pixel, i.e., when s=+1. When s=+1, the reverse raster lines (even-numbered lines in this example) are offset in the printed image from the forward raster lines (odd-numbered lines in this example) by one pixel in the +Dy direction. Therefore, the CPU 110 corrects the input value Vin1 in order to shift the reverse raster lines one pixel in the −Dy direction relative to the forward raster lines. In the example of FIG. 9(B), the CPU 110 shifts pixels in the forward raster line 0.5 pixels in the +Dy direction. In the multi-level calibration process M104, the CPU 110 corrects the input value Vin1 such that pixels in the forward raster line are shifted 0.5 pixels in the +Dy direction and pixels in the reverse raster lines are shifted 0.5 pixels in the −Dy direction. The CPU 110 may also correct the input value Vin1 such that pixels in the reverse raster lines are shifted one full pixel in the −Dy direction, without correcting input values related to pixels in the forward raster lines.

If a correction quantity Q (shift amount) is an integer, the CPU 110 sets the input value Vin1 of the pixel positioned a distance equivalent to the correction quantity Q from the process target pixel in the direction opposite the shift direction to the corrected input value Vin2 of the process target pixel. When the correction quantity Q is a fraction (0<Q<1), the CPU 110 performs input value correction using Equation 1 below.

$$Vin2=(1-Q) \times Vin1 + Q \times Vne \quad \text{(Equation 1)}$$

Here, Vne is the input value of the pixel adjacent to the process target pixel in the direction opposite the shift direction.

FIG. 9(C) shows an example of corrected input values for a case in which the two-way offset is +0.5 pixels, i.e., when s=+0.5. In this example, the CPU 110 corrects the input value Vin1 such that pixels in forward raster lines are shifted 0.25 pixels in the +Dy direction, while pixels in reverse raster lines are shifted 0.25 pixels in the −Dy direction.

Returning to FIG. 7, in S508 the CPU 110 adds a distribution error value Et to the corrected input value Vin2 to obtain an adjusted input value Va. The distribution error value Et is obtained from an error buffer EB and will be described later in greater detail.

In S510 the CPU 110 sets dot data Dout (a printed pixel value expressing the dot formation state) for the process target pixel based on the size relationship between the adjusted input value Va and three thresholds Th1-Th3. The thresholds Th1-Th3 are 1, 85, and 170, respectively. The CPU 110 sets the dot data Dout to indicate formation of a small dot when the adjusted input value Va is at least the first threshold Th1 but less than the second threshold Th2; to indicate formation of a medium dot when the adjusted input value Va is at least the second threshold Th2 but less than the third threshold Th3; and to indicate formation of a large dot when the adjusted input value Va is at least the third threshold Th3.

In S512 the CPU 110 converts the dot data Dout to a relative dot value Dr. The relative dot value Dr is a gradation value corresponding to one of four possible values (expressing four levels of dot formation) for the dot data Dout. Each relative dot values Dr represents a density in 256 levels that can be rendered by a corresponding one dot formation of the four levels of dot formation. In the first embodiment, the relative dot values Dr are set as follows.

A) Large dot: relative dot value Dr=255
B) Medium dot: relative dot value Dr=170
C) Small dot: relative dot value Dr=85
D) No dot: relative dot value Dr=0

The relative dot values Dr are incorporated as a relative value table DT in a program for controlling the CPU to perform the halftone process M106.

In S514 the CPU 110 distributes a target error value Ea among peripheral pixels based on the error matrix acquired in S504. Specifically, the CPU 110 calculates the target error value Ea using the following equation 2 in the halftone process M106.

$$\text{Target error value } Ea = \text{adjusted input value } Va - \text{relative dot value } Dr \quad \text{(Equation 2)}$$

The target error value Ea can be considered error produced between the dot data for the process target pixel (dot data converted to the relative dot value Dr) and the input value for the process target pixel (the adjusted input value Va). The CPU 110 distributes the target error value Ea among peripheral pixels based on the distribution ratios defined in the error matrix. The cumulative value of target error values Ea distributed in S514 are recorded in the error buffer EB for each unprocessed pixel (i.e., each pixel not yet subjected to the halftone process). The distribution error value Et acquired in S508 is the cumulative value of target error values Ea recorded in the error buffer EB for the process target pixel. That is, the distribution error value Et is the cumulative value of error distributed to the process target pixel using the error matrix from among the target error value Ea of processed pixels (i.e., pixels that have been subjected to the halftone process and for which dot data has been set).

The halftone process described above generates bitmap data constituting dot data of printed pixels for each ink color.

According to the first embodiment described above, the CPU 110 executes the halftone process using the error matrix. The error matrix is adjusted according to the pixel offset produced in the printed image on the printing medium 300 relative to the pixel positions indicated in the bitmap data BD in the main scanning direction. Thus, the MFP 600 can minimize a drop in image quality caused by pixel offset when such offset occurs.

Specifically, the second line matrix LM2 in the error matrix is produced by shifting the second line matrix LM2 in the reference error matrix in the direction opposite the pixel offset. This adjustment can minimize a decrease in image quality caused by pixel offset between the process target pixel and pixels in a raster line different from the raster line that includes the process target pixel.

By shifting the second line matrix LM2 an amount equal to the amount of pixel offset, it is possible to effectively prevent a decline in printing quality equivalent to the amount of pixel offset.

If the amount of pixel offset is N pixels, where $0<N<1$, the second line matrix LM2 is shifted using a fractional shift method. Hence, a decline in image quality caused by pixel offset can easily be reduced, even when the offset is less than one pixel. In particular, the MFP 600 can easily minimize a drop in image quality caused by pixel offset, even when the printing unit 200 cannot adjust the ink ejection timing with sufficient precision, such as when the printing unit 200 is not provided with a sufficient capacity to control ejection timing with sufficient precision due to cost constraints. To put this another way, use of the halftone process according to the embodiment described above can lead to reduce costs for the printing unit 200, without leading to a decrease in image quality caused by pixel offset.

Further, the direction for shifting the second line matrix LM2 is opposite between the error matrix for pixels in forward raster lines (the error matrix MBa in FIG. 8(B), for example) and the error matrix for pixels in reverse raster lines (the error matrix MBb in FIG. 8(B), for example). As a result, the MFP 600 of the preferred embodiment can suppress a drop in image quality caused by offset between forward prints and reverse prints in two-way printing.

Figure 10A:
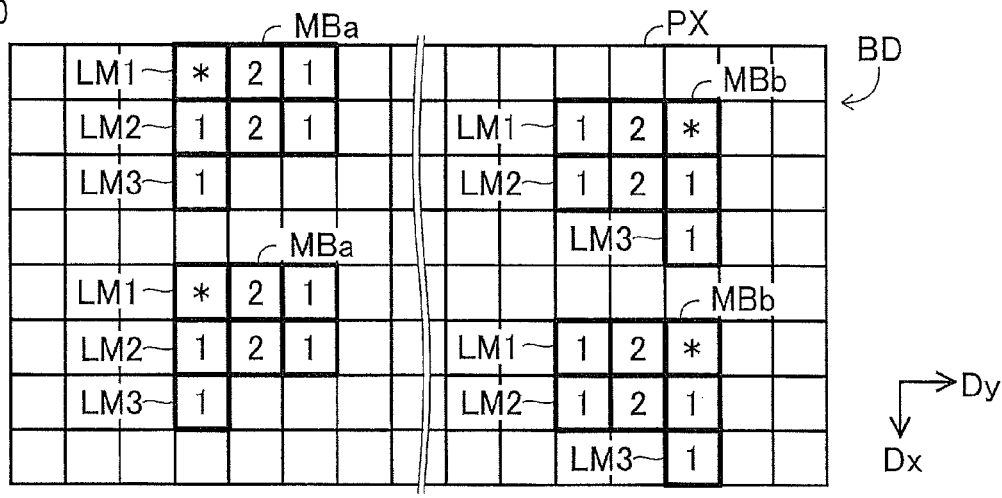
FIGS. 10(A)-10(C) are explanatory diagrams showing effects of the first embodiment.
Figure 10B:
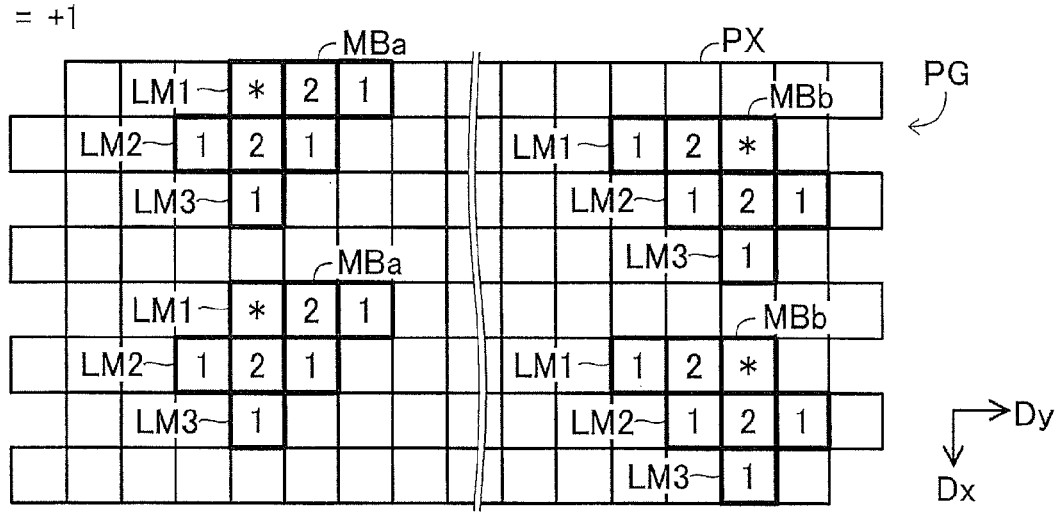
Figure 10C:
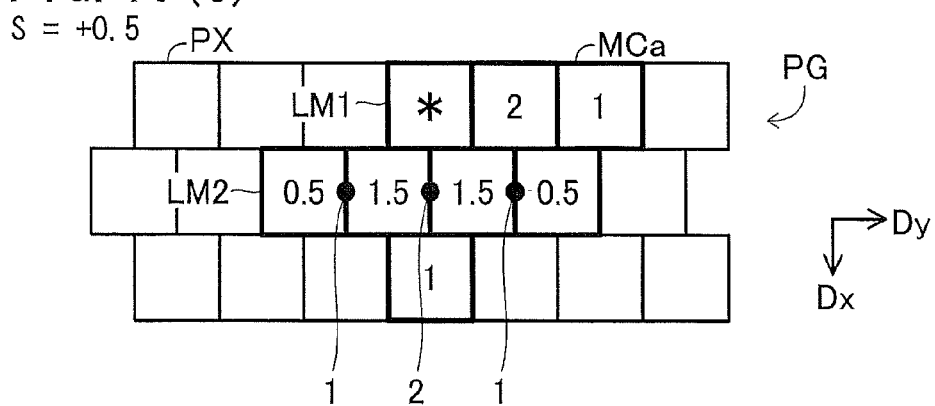

FIGS. 10(A)-10(C) are explanatory diagrams showing the effects of the first embodiment. In this example, the two-way offset is +1 pixel. FIG. 10(A) indicates the pixel position in image data (the bitmap data BD), i.e., the pixel position when no pixel offset (two-way offset in the first embodiment) is produced. FIG. 10(B) shows the positions of pixels on the printing medium 300 for a printed image PG (pixel positions in which pixel offset has been produced). In the first embodiment, the error matrices MB (Fig. (B)) in which the shift-target line matrix (the second line matrix LM2) in the reference error matrix MA has been shifted to cancel pixel offset is applied to multi-level values (gradation values of the CMYK pixel data) in the image data for the pixel position (the ideal pixel position).

By applying the error matrix MB, the positions of pixels in the image to which the target error value Ea has been distributed are shifted from the image data (where there is no pixel offset) in a direction opposite the pixel offset. As a result, the target error value Ea can be distributed to positions in the printed image PG (where there is pixel offset) to which the target error value Ea was intended to have been distributed. As shown in the printed image PG (having pixel offset) in FIG. 10(B), the pixels to which the error matrix MB distributes the target error value Ea are identical to the pixels marked for error distribution in the reference error matrix MA, where there is no pixel offset.

This method works similarly when shifting a shift-target line matrix in response to pixel offset at a precision greater than one pixel. FIG. 10(C) illustrates an example in which the shift amount is 0.5 pixels. In this case, the printed image PG (having pixel offset) shows that the distribution of target error value Ea produced by the error matrix MCa approaches the distribution based on the reference error matrix MAa when there is no pixel offset. Specifically, the distribution ratios at positions indicated by three black dots in FIG. 10(C) are calculated to be 1, 2, and 1 through linear interpolation. These values are equivalent to the distribution ratios defined for the positions of the three black dots in the reference error matrix MAa, when there is no pixel offset.

As a result, the arrangement of dots in the printed image PG (having pixel offset) can approach the arrangement of dots achieved using the reference error matrix MA, when there is no pixel offset, particularly for regions of an image having uniform density. The method can minimize a drop in image quality caused by pixel offset, particularly in regions of uniform density. Thus, the method of the first embodiment is particularly significant for improving graininess in regions of uniform density, where such graininess is particularly noticeable.

In the first embodiment, the CPU 110 corrects the input value Vin1 based on the pixel offset prior to performing the halftone process. This is particularly useful for preventing a decline in image quality at edge parts of a printed image (jagged edges and the like) caused by pixel offset. A halftone process using an error matrix is less effective in improving the quality of edge portions of a printed image than for improving the quality of regions having uniform density. For decreased image quality caused by pixel offset, the MFP 600 according to the preferred embodiment can most effectively improve image quality in edge parts by correcting the input gradation values Vin and improve image quality in regions of relatively uniform density by performing a halftone process using an error matrix.

Note that the control unit 100 according to the first embodiment corrects the input value Vin1, regardless of whether the pixel constitutes an image portion, but the control unit 100 may perform an image process to detect edge parts and correct the input values Vin1 only for pixels in these edge parts. It is preferable that the control unit 100 correct the input value Vin1 for at least pixels in edge parts of the image to be printed based on the pixel offset. However, since the method of correcting the input values Vin1 in the preferred embodiment does not bring about change in input values Vin1 for regions of uniform density, this method essentially just corrects input values Vin1 for pixels constituting edge parts.

B. Second Embodiment

B-1: Pixel Offset

The second embodiment covers a halftone process for pixel offset generated by positional deviation among nozzles 250*n* in the print head 250 (nozzle offset). The structure of the MFP 600 according to the second embodiment is identical to that described in FIG. 1 of the first embodiment. The nozzle offset considered in the second embodiment includes both offset in the main scanning direction and offset in the paper-opposing direction.

Figure 11:
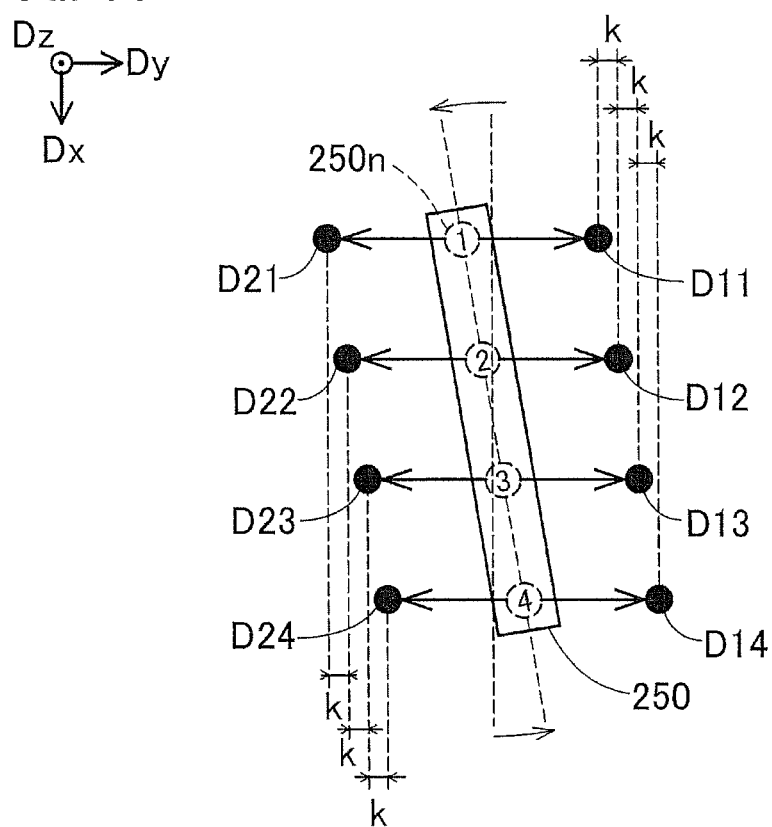
FIG. 11 is an explanatory diagram illustrating a nozzle offset in a main scanning direction in a second embodiment of the present invention.

FIG. 11 is an explanatory diagram illustrating nozzle offset in the main scanning direction. Nozzle offset in the main scanning direction occurs when the position of the second nozzle with respect to the position of the first nozzle deviates from its design position in the main scanning direction. Here, the first and second nozzles are two of the plurality of nozzles 250n in the nozzle row used for ejecting one color of ink (see FIG. 2(B)). As illustrated in FIG. 11, nozzle offset in the main scanning direction may occur when the print head 250 is skewed from its design position along a plane running parallel to the main scanning direction (+Dy and −Dy directions) and the sub-scanning direction (+Dx direction) (hereinafter referred to as "horizontal skew"), for example. In other words, nozzle skew in the main scanning direction can occur, for example, when the print head 250 is rotated from its design position about an axis oriented in the Dz direction.

The four nozzles 250n arranged at equal intervals N in the sub-scanning direction (+Dx direction) in FIG. 11 will be called nozzles 1, 2, 3, and 4 beginning from the upstream side in the sub-scanning direction. When using nozzle 1 as a reference point, nozzle skew in the main scanning direction caused by horizontal skew in the print head 250 is greater for nozzles farther separated from nozzle 1. Accordingly, when using pixels in a raster line printed by nozzle 1 as reference, pixel offset caused by horizontal skew in the print head 250 (offset due to horizontal head skew) is greater for pixels in raster lines printed by nozzles separated farther from nozzle 1.

FIG. 11 shows dots D11-D14 formed by ink ejected from nozzles 1-4 in a forward pass, and dots D21-D24 formed by ink ejected from nozzles 1-4 in a reverse pass. As shown in FIG. 11, if dot D12 is offset an amount k from dot D11 due to horizontal head skew, dot D13 is offset from dot D11 by an amount 2 k, while dot D14 is offset an amount 3 k from dot D11. Similarly, when dot D22 is offset an amount k from dot D21, dot D23 is offset an amount 2 k from dot D21 while dot D24 is offset an amount 3 k from dot D21. For offset due to horizontal head skew, the direction of offset between positions of pixels printed in a forward pass is the same as the direction of offset between pixels printed in a reverse pass.

Figure 12A:
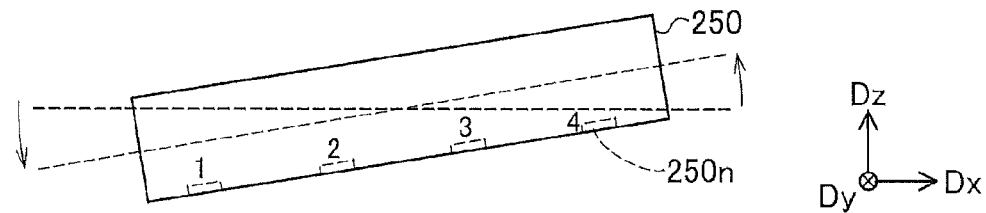
FIG. 12(A) is an explanatory diagram illustrating a nozzle offset in a paper-opposing direction.
Figure 12B:
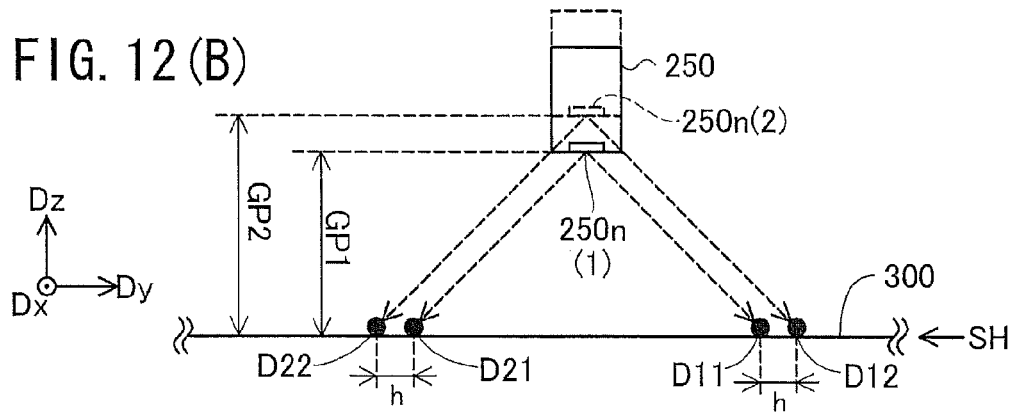
FIGS. 12(B) and 12(C) are explanatory diagrams illustrating impact positions of ink droplets ejected from the print head shown in FIG. 12(A)
Figure 12C:
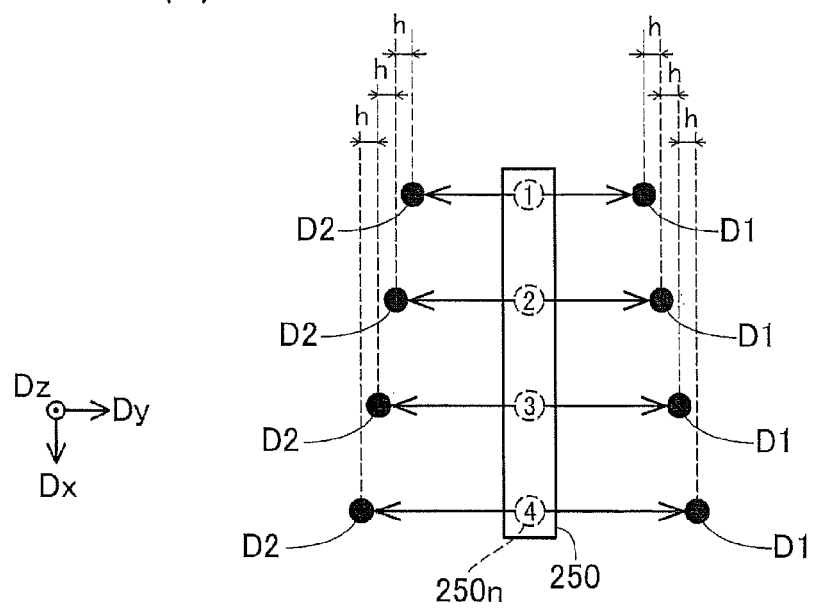

FIGS. 12(A)-12(C) illustrate examples of nozzle offset in the paper-opposing direction occurs when the position of the second nozzle with respect to the first nozzle deviates from its design position in the paper-opposing direction (the Dz direction in FIGS. 12(A)-12(C)). The paper-opposing direction is the direction in which the nozzles (nozzle-forming surface of the print head 250) oppose the printing medium 300. The first and second nozzles are two of the plurality of nozzles 250n included in a nozzle row for ejecting ink of the same color (see FIG. 2(B)). As illustrated in FIG. 12(A), nozzle offset in the paper-opposing direction may occur, for example, when the print head 250 is tilted from its design position along a vertical plane that includes the sub-scanning direction (+Dx direction), for example (hereinafter called "vertical skew"). In other words, nozzle offset in the paper-opposing direction may occur when the print head 250 is rotated from its design position about an axis extending in the main scanning direction (+Dy and −Dy directions).

Nozzle offset in the paper-opposing direction creates a difference in gaps between the nozzles and the printing medium 300. In the example of FIG. 12(B), a gap GP1 between nozzle 1 and the printing medium 300 differs from a gap GP2 between nozzle 2 and the printing medium 300. This difference in gaps generates pixel offset in the main scanning direction between the dots D11 and D21 formed by ink ejected from nozzle 1 and dots D21 and D22 formed by ink ejected from nozzle 2 (see FIG. 12(B)).

As shown in FIG. 12(A), if nozzle 1 is used as a reference point, nozzle offset in the paper-opposing direction caused by vertical skew in the print head 250 increases for nozzles farther away from nozzle 1. Accordingly, when pixels in a raster line printed by nozzle 1 are used as reference, pixel offset caused by vertical skew in the print head 250 (offset due to vertical head skew) is greater for pixels in raster lines printed by nozzles separated farther from nozzle 1.

As in the example of FIG. 11, FIG. 12(C) shows dots D11-D14 formed by ink ejected from nozzles 1-4 in a forward pass, and dots D21-D24 formed by ink ejected from nozzles 1-4 in a reverse pass. As is clear from FIG. 12(C), if dot D12 is offset an amount h from dot D11 due to vertical head skew, then dot D13 is offset an amount 2 h from dot D11 and dot D14 is offset an amount 3 h from dot D11. Similarly, when dot D22 is offset an amount h from dot D21 due to vertical head skew, then dot D23 is offset an amount 2 h from dot D21 and dot D24 is offset an amount 3 h from dot D21. Accordingly, when offset is caused by vertical head skew, the direction of offset for pixels printed in a forward scan is opposite the direction of offset for pixels printed in a reverse scan.

B-2: Halftone Process

As in the first embodiment, the error matrix used in the halftone process according to the second embodiment may differ according to the printing method. The following example of the second embodiment assumes the printing method is two-way non-interlaced printing.

B-2-1: Offset Due to Horizontal Head Skew

Figure 13:
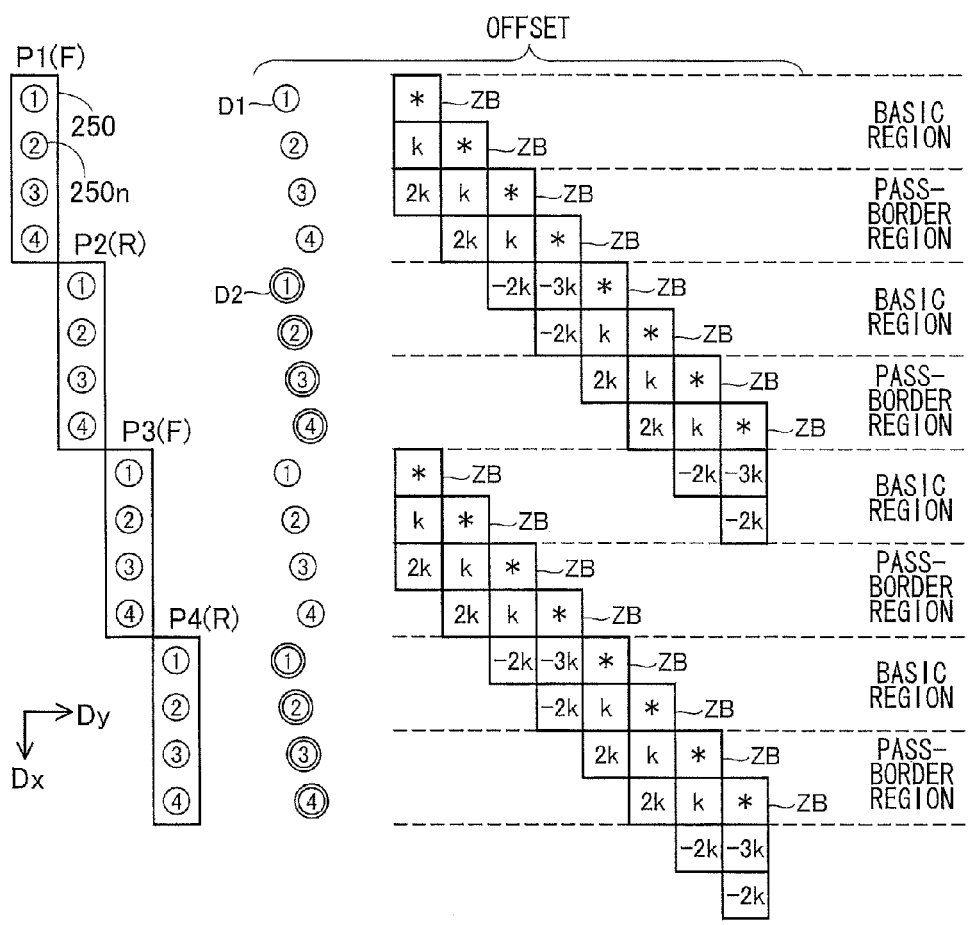
FIG. 13 is an explanatory diagram illustrating offset caused by horizontal head skew.

FIG. 13 is an explanatory diagram illustrating offset caused by horizontal head skew during two-way non-interlaced printing. As in FIG. 5, the left side of FIG. 13 indicates positions of the print head 250 in the sub-scanning direction for each pass used to print bitmap data (not shown).

As shown in FIG. 13, two-way interlaced printing in the second embodiment is single-pass printing in which the dot pitch is equivalent to the nozzle pitch NP. In two-way non-interlaced printing, odd-numbered passes are forward passes and even-numbered passes are reverse passes. A unit sub scan equivalent to the head length (four times the nozzle pitch NP in the example of FIG. 13) is performed between consecutive passes.

The following example illustrates a case in which positive offset of an amount k is generated due to horizontal head skew. To illustrate this offset caused by horizontal head skew, FIG. 13 shows the positional relationships of dots D1 printed in forward passes and dots D2 printed in reverse passes, as in the example of FIG. 5. FIG. 13 also includes the boxes ZB. The content of the boxes ZB in FIG. 13 differs between boxes ZB whose reference raster line (the position indicated by an "*") is located in a basic region and boxes ZB whose reference raster line is located in a pass-border region. As described earlier, the error matrix is created by shifting a shift-target line matrix in the reference error matrix MA to cancel relative offset indicated in the box ZB. It is clear from this example that the error matrix used for pixels in the raster line of a basic region will differ from the error matrix used for pixels in the raster line of a pass-border region when the offset is caused by horizontal head skew.

A pass-border region is an area constituting two raster lines positioned along the border between a region printed in a forward pass and a region printed in a reverse pass. A basic region is any area other than the pass-border regions. The halftone process for pixels in raster lines of a basic region is designed for printing the three raster lines corresponding to the error matrix (the target raster line, the first proximal raster line to the target raster line, and the second proximal raster line to the target raster line) all in the same pass (either a forward or a reverse pass). The halftone process that targets pixels in raster lines of a pass border region is designed for printing some of the three raster lines corresponding to the error matrix and the others in a reverse pass. For the sake of simplicity, FIG. 13 shows only four nozzles in the print head 250. However, the actual number of nozzles is much greater than four (200, for example) and, hence, the majority of the printed image is actually made up of basic regions.

For each raster line in a basic region, pixel offset is "k" for the first proximal raster line and "2 k" for the second proximal raster line. Thus, pixel offset generated by horizontal head skew increases in steps based on the amount of skew in the head. The amount and direction of offset (the content in the boxes ZB) is the same for regions printed in a forward pass and regions printed in a reverse pass. Consequently, the same error matrix is used for both regions.

Figure 14A:
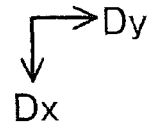
FIGS. 14(A)-14(D) show sample error matrices used for offset generated by head skew.
Figure 14B:
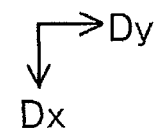

FIGS. 14(A)-14(D) show sample error matrices used for offset generated by head skew. FIG. 14(A) shows the reference error matrices MA. FIG. 14(B) shows error matrices ME used when offset due to horizontal head skew is +1/16 pixels, i.e., when k=+1/16. As shown in FIG. 14(B), the second line matrices LM2 in the error matrices MEa and MEb are shifted 1/16$^{th}$ of a pixel in the forward direction from the second line matrices LM2 in the reference error matrices MAa and MAb. Similarly, the third line matrices LM3 in the error matrices MEa and MEb are shifted 2/16$^{th}$ of a pixel in the forward direction from the third line matrices LM3 in the reference error matrices MAa and MAID. These error matrices ME are applied to each raster line in basic regions printed in both forward passes and reverse passes. As described earlier, the direction of shift for line matrices LM2 and LM3 are the same for regions printed in forward passes and regions printed in reverse passes when offset is caused by horizontal head skew.

While not shown in the drawings, error matrices applied to raster lines in pass-border regions may be created by shifting the shift-target line matrix of the reference error matrices MA in order to cancel the relative offset indicated in the boxes ZB of FIG. 13. Alternatively, the error matrices used for basic regions may also be applied to the pass-border regions, without creating special error matrices for the pass-border regions, since these regions are small in relation to the basic regions.

B-2-2: Offset Due to Vertical Head Skew

Figure 15:
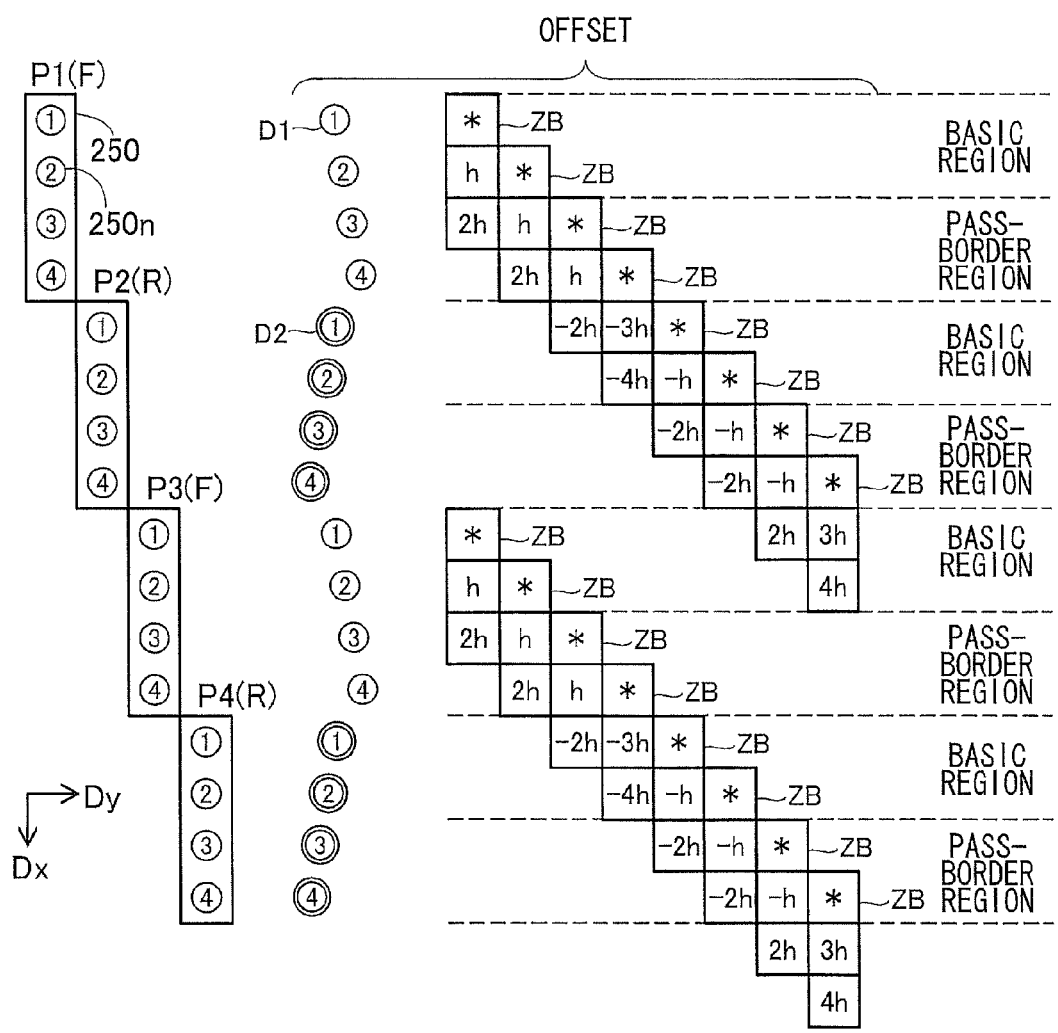
FIG. 15 is an explanatory diagram illustrating an example of offset generated by vertical head skew when performing two-way non-interlaced printing.

FIG. 15 illustrates an example of offset generated by vertical head skew when performing two-way non-interlaced printing. As in FIG. 13, the left side of FIG. 15 indicates positions of the print head 250 in the sub-scanning direction for each pass used to print bitmap data (not shown).

The following example addresses the case of positive offset of an amount h generated due to horizontal head skew. As in FIG. 13, FIG. 15 shows the positional relationship between dots D1 printed in forward passes and dots D2 printed in reverse passes to illustrate offset due to vertical head skew. FIG. 15 also includes boxes ZB, where the content of boxes ZB for raster lines in basic regions differs from the content of boxes ZB for raster lines in pass-border regions. Hence, as with the case of offset generated by horizontal head skew, it is clear that the error matrix applied to pixels in raster lines of basic regions differs from the error matrix applied to pixels in raster lines of pass-border regions in the case of offset generated by vertical head skew.

As shown in FIG. 15, for each raster line of basic regions printed in forward passes, the pixel offset is "h" for the first proximal raster line and "2 h" for the second proximal raster line. Thus, the form of pixel offset in regions printed in forward passes is similar to the pixel offset for offset generated by horizontal head skew. For each raster line of basic regions printed in reverse passes, on the other hand, the pixel offset is "−h" for the first proximal raster line and "−2 h" for the second proximal raster line. Thus, the form of pixel offset in regions printed in reverse passes has a direction opposite that of pixel offset generated by horizontal head skew. Therefore, the error matrix used for regions printed in forward passes differs from the error matrix used in regions printed in reverse passes when offset is caused by vertical head skew.

Figure 14C:
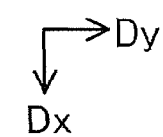

FIG. 14(C) shows error matrices MF when offset caused by vertical head skew is +1/16 pixels, i.e., when h=+1/16. These error matrices MF are applied to basic regions printed in forward passes. The error matrices MF are identical to the error matrices ME (FIG. 14(B)) used in basic regions for offset due to horizontal head skew.

Figure 14D:
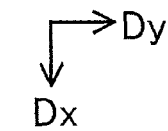

FIG. 14(D) shows error matrices MG when offset caused by vertical head skew is +1/16 pixels, i.e., when h=+1/16. The error matrices MG are applied to basic regions printed in reverse passes. The line matrices LM2 and LM3 in the error matrices MGa and MGb are shifted the same amount as the line matrices LM2 and LM3 in the error matrices MFa and MFb. However, the line matrices LM2 and LM3 of the error matrices MGa and MGb are shifted in the opposite direction as the line matrices LM2 and LM3 of the error matrices MFa and MFb.

While not shown in the drawings, the error matrices applied to raster lines in pass-border regions may be created by shifting the shift-target line matrix in the reference error matrix MA in order to cancel the two-way offset indicated in the boxes ZB in FIG. 15. Alternatively, the error matrices used for basic regions may also be applied to pass-border regions, without creating a special error matrix for these regions.

The halftone process according to the second embodiment is identical to the halftone process of the first embodiment (FIG. 7), except for the difference in error matrices that are used. For example, in S502 of FIG. 7, the CPU 110 will acquire the value k representing offset caused by horizontal head skew and the value h representing offset caused by vertical head skew as calibration coefficients Pc. In S504 the CPU 110 will acquire the error matrices described above using these calibration coefficients Pc.

According to the second embodiment described above, the CPU 110 executes the halftone process using error matrices adjusted according to pixel offset caused by both horizontal head skew and vertical head skew. Thus, this process can minimize a decrease in print quality from pixel offset caused by deviation in positions of nozzles used for the same color.

The CPU 110 also executes a halftone process using error matrices adjusted according to nozzle offset in the main scanning direction represented by offset due to horizontal head skew. Thus, this process can minimize a decrease in print quality from pixel offset caused by nozzle offset in the main scanning direction. In this case, the error matrices ME (FIG. 14(B)) are applied both to raster lines printed in forward prints and raster lines printed in reverse prints.

The CPU 110 also executes a halftone process using error matrices adjusted according to nozzle offset in the paper-opposing direction represented by offset due to vertical head skew. Thus, this process can minimize a decrease in print quality from pixel offset caused by nozzle offset in the paper-opposing direction. In this case, the CPU 110 uses both the error matrices MF (FIG. 14(C)) for raster lines printed in the forward direction and the error matrices MG (FIG. 14(D) for raster lines printed in the reverse direction.

C. Third Embodiment

The third embodiment covers a halftone process for compound pixel offset generated by both the two-way offset described in the first embodiment and nozzle offset described in the second embodiment. The structure of the MFP 600 according to the third embodiment is identical to that described in FIG. 1 of the first embodiment. The compound pixel offset considered in the third embodiment includes a combination of two-way offset and offset due to vertical head skew (hereinafter referred to as "second compound pixel offset").

C-1: Halftone Process

As in the first embodiment, the error matrix used in the halftone process according to the third embodiment may differ according to the printing method. The following example of the third embodiment assumes that the printing method is two-way interlaced printing, as described in FIG. 5 of the first embodiment.

Figure 16:
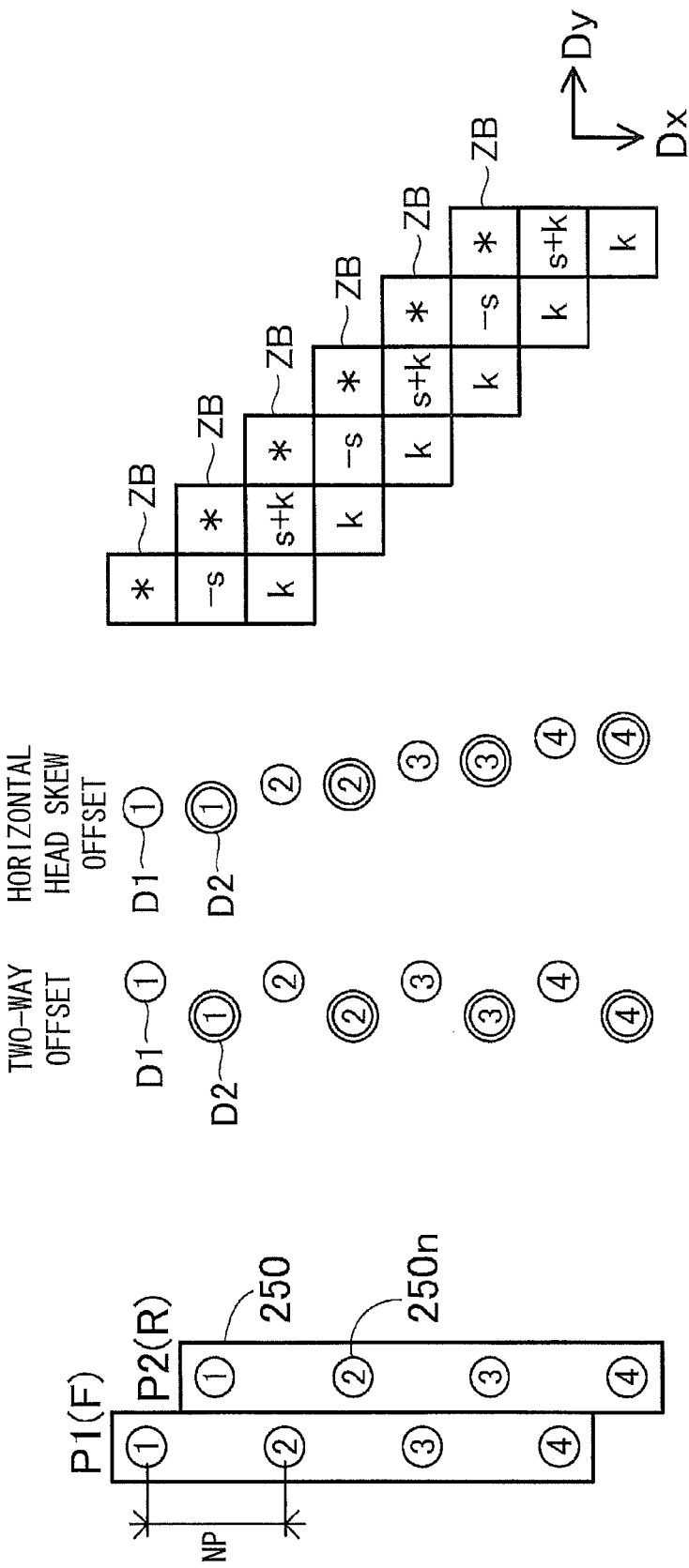
FIG. 16 is an explanatory diagram illustrating a compound offset including two-way offset and offset by horizontal head skew during two-way interlaced printing in a third embodiment of the present invention.

C-1-1: Compound Offset Comprising Two-Way Offset and Offset Due to Horizontal Head Skew FIG. 16 is an explanatory diagram illustrating compound offset including two-way offset and offset due to horizontal head skew during two-way interlaced printing (hereinafter referred to as the "first compound pixel offset"). As in FIG. 5, the left side of FIG. 16 indicates positions of the print head 250 in the sub-scanning direction for each pass used to print bitmap data (not shown).

The following example illustrates the case in which two-way offset of an amount s described in FIG. 5 of the first embodiment is combined with offset of an amount k due to horizontal head skew described in FIG. 13 of the second embodiment. The amount and direction of the first compound pixel offset is determined by the sum of contributions from the two-way offset and contributions of offset due to horizontal head skew. FIG. 16 conceptually illustrates the contribution of two-way offset to the positional relationship between dots D1 printed in forward passes and dots D2 printed in reverse passes, as well as the contribution of offset due to horizontal head skew to the same relationship.

As shown in FIG. 16, the contribution of two-way offset shifts raster lines formed by even-numbered lines of image data (even-numbered lines) an amount s in the reverse direction (−Dy direction) from odd-numbered raster lines (odd-numbered lines). Within the region printed by the same passes, the contribution of offset due to horizontal head skew shifts odd-numbered lines adjacent in the sub-scanning direction to the even-numbered lines in the forward direction (+Dy direction) relative to the even-numbered lines.

The boxes ZB in FIG. 16 indicate the relative pixel offset between raster lines found by adding these contributions. Specifically, even-numbered lines adjacent in the sub-scanning direction to odd-numbered lines are shifted an amount s in the reverse direction from the odd-numbered lines. Further, odd-numbered lines positioned two lines in the sub-scanning direction from other odd-numbered lines are shifted an amount k in the forward direction from these other odd-numbered lines. Further, odd-numbered lines adjacent in the sub-scanning direction to even-numbered lines are shifted an amount s+k in the forward direction from the even-numbered lines. Further, even-numbered lines positioned two lines in the sub-scanning direction from other even-numbered lines are shifted an amount k in the forward direction from the other even-numbered lines.

The error matrix is created by shifting a shift-target line matrix in the reference error matrix MA to cancel relative offset indicated in the box ZB. FIG. 17(A)-17(C) show sample error matrices used when compound pixel offset is generated. FIG. 17(B) shows error matrices MH used when two-way offset is +1 pixel and offset due to horizontal head skew is +$\frac{1}{16}$ pixels, i.e., when s=+1 and k=+$\frac{1}{16}$. The error matrix MHa is obtained by shifting the second line matrix LM2 in the reference error matrix MAa one pixel in the forward direction (+Dy direction) and by shifting the third line matrix LM3 $\frac{1}{16}^{th}$ of a pixel in the reverse direction (−Dy direction). The error matrix MHb is obtained by shifting the second line matrix LM2 in the reference error matrix MAb $\frac{17}{16}^{th}$ of a pixel in the reverse direction (−Dy direction) and by shifting the third line matrix LM3 $\frac{1}{16}^{th}$ of a pixel in the reverse direction. The error matrix MHa is used when processing pixels in odd-numbered lines, while the error matrix MHb is used when processing pixels in even-numbered lines.

C-1-2: Two-Way Offset and Offset Due to Vertical Head Skew

Figure 18:
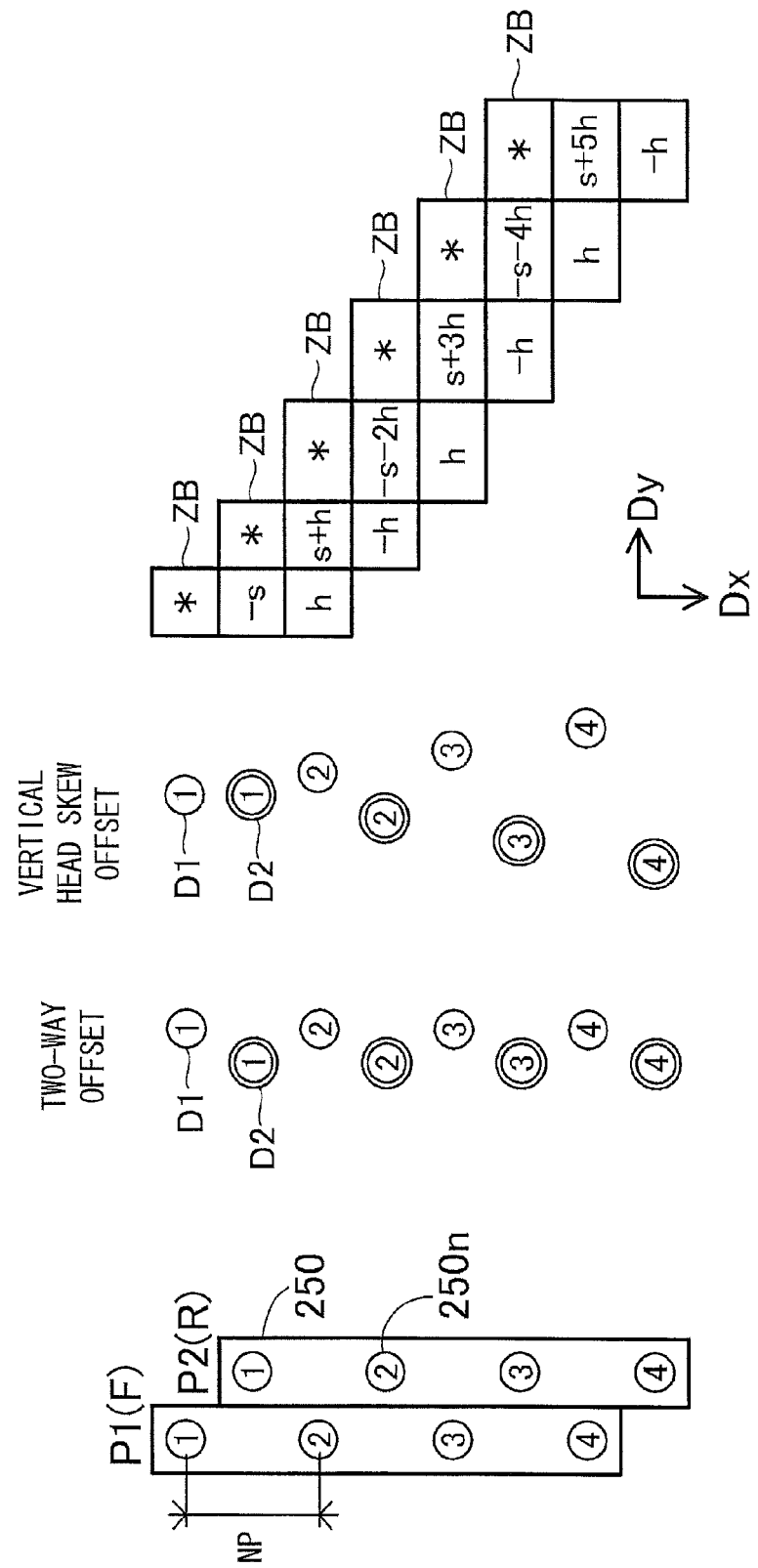
FIG. 18 is an explanatory diagram illustrating a compound offset including two-way offset and a offset due to vertical head skew generated during two-way interlaced printing.

FIG. 18 illustrates an example of compound offset including two-way offset and offset due to vertical head skew generated during two-way interlaced printing (hereinafter referred to as "second compound pixel offset"). As in FIG. 5, the left side of FIG. 18 indicates positions of the print head 250 in the sub-scanning direction for each pass used to print bitmap data (not shown).

The following example addresses the case of two-way offset of an amount s described in FIG. 5 of the first embodiment combined with offset due to vertical head skew of an amount h described in FIG. 15 of the second embodiment. The amount and direction of the second compound pixel offset is determined by the sum of the contribution of two-way offset and the contribution of offset due to vertical head skew. FIG. 18 conceptually illustrates the contribution of two-way offset to the positional relationship between the dots D1 printed in forward passes and dots D2 printed in reverse passes, as well as the contribution of offset due to vertical head skew to the same relationship.

As shown in FIG. 18, the contribution of two-way offset shifts even-numbered lines an amount s in the reverse direction (−Dy direction) from odd-numbered lines. Further, the contribution of offset due to vertical head skew within the range printed by the same passes does not shift the second raster line relative to the first raster line, but shifts even-numbered lines adjacent in the sub-scanning direction to odd-numbered lines, excluding the first odd-numbered line, 2×(n−1)×h in the reverse direction (−Dy direction) from the odd-numbered lines, where n is the number of the nozzle in the nozzles 250n that printed the odd-numbered line (the number of nozzles counted from the upstream end of the nozzles 250n in the sub-scanning direction to the nozzle that printed the odd-numbered line). The contribution of offset due to vertical head skew within the range printed by the same passes shifts odd-numbered lines adjacent in the sub-scanning direction to even-numbered lines (2×n−1)×h in the forward direction (+Dy direction) from the even-numbered lines.

The boxes ZB in FIG. 18 indicate the relative pixel offset between raster lines found by adding these contributions. That is, even-numbered lines adjacent in the sub-scanning direction to odd-numbered lines are shifted {s+2×(n−1)×h} in the reverse direction from the odd-numbered lines. Further, odd-numbered lines positioned two lines in the sub-scanning direction from other odd-numbered lines are shifted h in the forward direction from the other odd-numbered lines. Further, odd-numbered lines adjacent in the sub-scanning direction to even-numbered lines are shifted {s+(2×n−1)×h} in the forward direction from the even-numbered lines. Further, even-numbered lines positioned two lines in the sub-scanning direction from other even-numbered lines are shifted h in the reverse direction from the other even-numbered lines.

An error matrix is created by shifting a shift-target line matrix in the reference error matrix MA to cancel relative offset indicated in the box ZB. FIG. 17(C) shows error matrices MJ used when two-way offset is +1 pixel and offset due to vertical head skew is +1/16 of a pixel, i.e., when s=+1 and h=+1/16. The error matrix MJa is used when processing pixels of raster lines printed by nozzle 1 in forward passes (pass P1(F) in FIG. 18, for example). The error matrix MJb is used when processing pixels of raster lines printed by nozzle 1 in reverse passes (pass P2(R) in FIG. 18, for example). The error matrix MJc is used when processing pixels in raster lines printed by nozzle 2 in forward passes, and the error matrix MJd is used when processing pixels in raster lines printed by nozzle 2 in reverse passes. In the example of FIG. 18, different error matrices are used for each raster line in a region printed by a combination of one forward pass and one reverse pass.

According to the third embodiment described above, the CPU 110 can execute the halftone process M106 using error matrices adjusted according to compound offset (see FIG. 17) when such compound offset is generated by the first compound pixel offset and second compound pixel offset. Thus, this process can minimize a decrease in print quality caused by such compound offset.

D. Fourth Embodiment

D-1: Structure of the Sub-scanning Unit 260 (Paper-Conveying Mechanism) According to a Fourth Embodiment FIGS. 19 (A) and 19(B) are explanatory diagrams including an enlarged perspective view of the main scanning unit 240 and sub-scanning unit 260 (see FIG. 2) according to the fourth embodiment. The MFP 600 of the fourth embodiment differs from that of the first embodiment in the structure of the sub-scanning unit 260 (the paper-conveying mechanism). Specifically, the sub-scanning unit 260 of the MFP 600 according to the fourth embodiment can convey a sheet of the printing medium 300 (paper), i.e., execute a sub scan, while deforming the printing medium 300 to have ripples along the main scanning direction.

FIG. 19(A) shows a cross section of the platen 265 (a cross section orthogonal to the sub-scanning direction at a position between the two rollers 261 and 262 (see FIG. 2)). As shown in FIG. 19(A), the platen 265 includes a plurality of low support parts 265a and a plurality of high support parts 265b. Each of the support parts 265a and 265b has a paper-supporting surface oriented in the sub-scanning direction. The paper-supporting surfaces of the high support parts 265b supports the printing medium 300 at a higher position than the paper-supporting surfaces of the low support parts 265a. The support parts 265a and 265b are arranged alternatingly in the main scanning direction (+Dy and −Dy directions).

Pressing parts 269 are disposed above the paper-supporting surfaces of the low support parts 265a. The pressing parts 269 bend a sheet of printing medium 300 conveyed by the first roller 261 into a rippled or wave-like shape at a position confronting the print head 250 (the position at which printing takes place). Hence, the sheet of printing medium 300 is held in a wave-like shape having peaks positioned above the high support parts 265b and valleys positioned above the low support parts 265a along the main scanning direction. The sub-scanning unit 260 maintains this wave-like shape in the printing medium 300 while conveying the same.

The sub-scanning unit 260 deforms the sheet of printing medium 300 into this wave-like shape to prevent the printing medium 300 from floating off the platen 265 toward the print head 250 due to curl in the sheet.

FIG. 19(B) indicates the positions of dots D1 and D2 formed by ink droplets I1 and I2 ejected from the print head 250. The dot D1 is formed by the first ink droplet I1 ejected when the print head 250 is moving in the +Dy direction, and the dot D2 is formed by the second ink droplet I2 ejected when the dot D2 is moving in the −Dy direction.

FIG. 19(B) illustrates gaps GP3 and GP4 formed between the nozzle surface np of the print head 250 and the printing medium 300. The gap GP3 is formed between the nozzle surface np and peaks Pyb of the wave-like printing medium 300. The gap GP4 is formed between the nozzle surface np and valleys Pya of the printing medium 300.

In FIG. 19(B), the region of the printing medium 300 is divided into first regions A1 and second regions A2 that are alternately juxtaposed along the main scanning direction. The first regions A1 are regions that include valleys Pya suppressed by the pressing parts 269, while the second regions A2 are regions including peaks Pyb supported by the high support parts 265b. In the first regions A1, the gap between the nozzle surface np and the printing medium 300 is greater than an intermediate value (a median, or mean value) between the gaps GP3 and GP4, for example. In the second regions A2, the gap between the nozzle surface np and the printing medium 300 is less than or equal to the intermediate value between the gaps GP3 and GP4, for example.

The ejection of the ink droplets I1 and I2 is adjusted under the assumption of printing in a horizontal plane SH that passes through the peaks Pyb. Consequently, pixel offset is relatively small in second regions A2 near peaks Pyb and relatively large in first regions A1 near valleys Pya. FIG. 19(B) shows the dots D1 and D2 formed by the ink droplets I1 and I2 ejected to form dots in a valley Pya. When printing in a first region A1 that includes a valley Pya, the impact positions of the ink droplets I1 and I2 (dot-forming positions) deviate from the desired position Pya because the gap GP4 at the valleys Pya is larger than the gap GP3 at the peaks Pyb (see FIG. 19(B)).

As is clear from the above description, two-way offset described in the first embodiment can differ even within the same raster line in the fourth embodiment depending on the position in the main scanning direction. In other words, two-way offset in a first region A1 is greater than two-way offset in a second region A2.

FIGS. 20(A)-20(D) illustrate the halftone process according to the fourth embodiment. FIG. 20(A) shows a target image ID represented by target image data (image data to be printed). The target image data represents an image having a single gradation value. FIG. 20(B) shows a printed image IP obtained by printing the target image data without performing the halftone process of the fourth embodiment. As shown in the drawing, the printed image has an uneven graininess between the first and second regions A1 and A2. This difference in graininess is due to the difference in two-way offset between the first and second regions A1 and A2 described above.

D-2: Halftone Process

FIG. 20(C) shows the content of the calibration coefficient data 138 in the fourth embodiment. The calibration coefficient data 138 in the fourth embodiment includes a plurality of reference calibration coefficients Pref associated with positions on the printing medium 300 in the main scanning direction. In order from the upstream side of the printing medium 300 toward the downstream side in the +Dy direction, the positions of the valleys Pya described with reference to FIG. 19(B) are referred to as positions Pya1, Pya2, ..., and Pya6 in FIG. 20(B), and the positions of the peaks Pyb are referred to as positions Pyb1, Pyb2, ..., and Pyb7. The positions of the valleys Pya and peaks Pyb are stored in units of pixels in the printed image, for example. A reference calibration coefficient Pref (1.0 in the fourth embodiment) is associated with two-way offset at positions Pya1, Pya2, ..., and Pya6 for valleys Pya, while another reference calibration coefficient Pref (0.0 in the fourth embodiment) is associated with two-way offset at positions Pyb1, Pyb2, ..., and Pyb7 for peaks Pyb. Hence, the calibration coefficient data 138 in this example holds data indicating that no two-way offset occurs at positions of the peaks Pyb on the printing medium 300, while the maximum two-way offset occurs at positions of valleys Pya on the printing medium 300.

The halftone process according to the fourth embodiment is similar to that described in FIG. 7 of the first embodiment. However, in S502 of FIG. 7 according to the fourth embodiment, the CPU 110 uses the calibration coefficient data 138 shown in FIG. 20(C) to acquire the calibration coefficient Pc corresponding to the position of the process target pixel in the main scanning direction. More specifically, in the error matrix acquisition process M108, the CPU 110 obtains the calibration coefficient Pc by performing linear interpolation using the reference calibration coefficients Pref recorded in the calibration coefficient data 138.

FIG. 20(D) conceptually illustrates the calibration coefficient Pc acquired by the CPU 110 through the error matrix acquisition process M108. In this way, intermediate values between the reference calibration coefficient Pref associated with valleys Pya (1.0) and the reference calibration coefficient Pref associated with peaks Pyb (0.0) can be obtained as calibration coefficients Pc for positions between the valleys Pya and peaks Pyb. As described with reference to FIG. 19(B), the gap between the nozzle surface np and the printing medium 300 varies continuously according to its position in the main scanning direction and is largest at the valleys Pya and smallest at the peaks Pyb. Consequently, the calibration coefficient Pc acquired in the fourth embodiment can be considered to correspond to the magnitude of gap between the nozzle surface np and printing medium 300.

By acquiring the calibration coefficients Pc in this way, in S504 of FIG. 7 the CPU 110 of the fourth embodiment can obtain an error matrix having different shift quantities for shift-target line matrices based on the position of the process target pixel in the main scanning direction.

The fourth embodiment described above uses a plurality of error matrix sets (sets of error matrices having different calibration coefficients Pc) adjusted based on the pixel offset (two-way offset), which differs according to the position on the printing medium 300 in the main scanning direction. Next, the CPU 110 executes the halftone process M106 while changing the error matrix set used based on the position of the process target pixel in the main scanning direction.

Thus, this process can minimize a decrease in print quality caused by pixel offset, even when the pixel offset (two-way offset) differs according to the position of the process target pixel on the printing medium 300 in the main scanning direction.

More specifically, the MFP 600 according to the preferred embodiment includes the sub-scanning unit 260 that performs sub scans while deforming the printing medium 300 so that the gap between the printing medium 300 and the nozzles 250n changes along the main scanning direction. Hence, the amount of shift for the shift-target line matrix differs for each error matrix set according to the magnitude of gap between the printing medium 300 and nozzles 250n.

Accordingly, the printing unit 200 can minimize a decrease in print quality due to pixel offset based on deformation of the printing medium 300, even when executing sub scans while deforming the printing medium 300 so that the gap between the printing medium 300 and nozzles 250n varies along the main scanning direction. For example, the printing unit 200 can reduce irregular graininess between the first and second regions A1 and A2 shown in FIG. 20(B), thereby improving the quality of the printed image.

E. Fifth Embodiment

While the CPU 110 employs an error diffusion method described with reference to FIGS. 6 and 7 when executing the halftone process M106 in the first through fourth embodiments, the CPU 110 employs an error accumulation method in the halftone process M106 according to the fifth embodiment.

Figure 21:
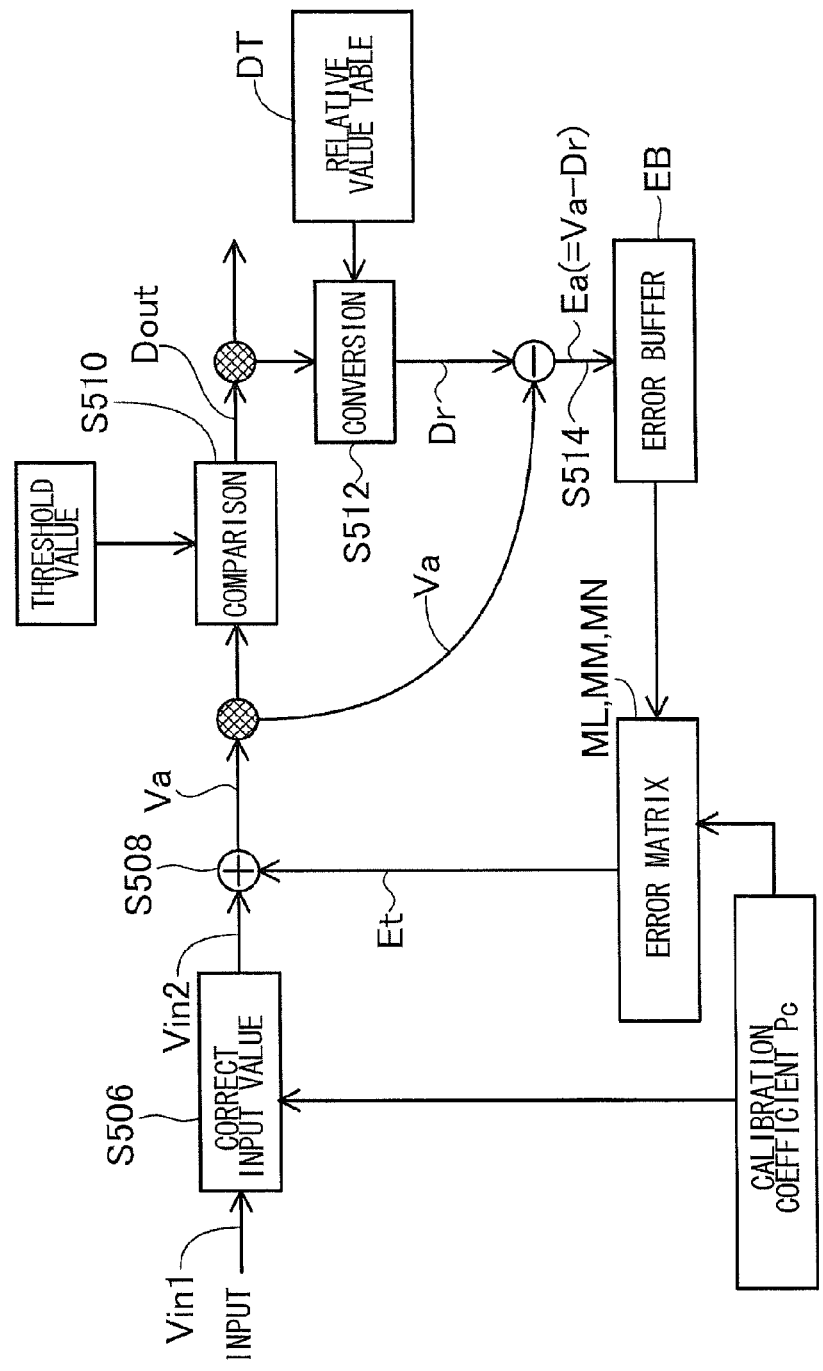
FIG. 21 is an explanatory diagram illustrating a halftone process according to an error diffusion method in a fifth embodiment of the present invention.

FIG. 21 shows an overview of this error accumulation method. In S514 of FIG. 7 executed according to the error diffusion method, the CPU 110 sets distribution ratios for peripheral pixels to which the calculated target error value Ea is to be distributed (unprocessed pixels; i.e., pixels not yet subjected to the halftone process) according to an error matrix. The CPU 110 then stores the distribution ratios in the error buffer EB for each peripheral pixel.

In the error accumulation method of the fifth embodiment, the CPU 110 records the calculated target error value Ea in the error buffer EB as the error value produced at the process target pixel in the halftone process M106. When subsequently executing S508 of FIG. 7 for a pixel processed later in the processing order, the CPU 110 calculates the distribution error value Et to be added to the corrected input value Vin2 using an error matrix for error accumulation (described later). That is, the CPU 110 collects the portion of error distributed to the process target pixel and calculates the distribution error value Et from the target error value Ea of peripheral pixels that have already been processed (i.e., pixels that have been subjected to the halftone process and for which dot data has been set) using the error matrix for error accumulation.

Thus, despite these differences in how the target error value Ea is stored in the error buffer EB in S514 and how the distribution error value Et is acquired in S508, the error diffusion method and error accumulation method implement essentially the same halftone process.

FIGS. 22 and 23 show sample error matrices for error accumulation. FIG. 22(A) shows reference error matrices MKa and MKb for error accumulation. The reference error matrices MK are substantially equivalent to the reference error matrices MA for error diffusion (see FIG. 8(A)) and are designed to achieve good image quality when no pixel offset occurs. Each of the reference error matrices MK includes three line matrices LM1-LM3. The first line matrix LM1 defines error distribution ratios for peripheral pixels in a target raster line, which is the raster line containing the process target pixel. The second line matrix LM2 defines the error distribution ratios for peripheral pixels in a first opposite proximal raster line to the target raster line, and the third line matrix LM3 defines the error distribution ratios for peripheral pixels in a second opposite proximal raster line to the target raster line. Here, the first opposite proximal raster line is adjacent to the target raster line in the opposite direction from the first proximal raster line described in the previous embodiments. Hence, the first opposite proximal raster line is adjacent to the target raster line in the direction opposite the sub-scanning direction (−Dx direction). The second opposite proximal raster line is positioned two lines from the target raster line in the direction opposite the sub-scanning direction (−Dx direction).

As with the error matrices for error diffusion, the error matrices for error accumulation are created by shifting a shift-target line matrix in the reference error matrix MK based on relative offset. A shift-target line matrix is one of the line matrices LM2 and LM3 that produces relative offset in the corresponding raster line (the first opposite proximal raster line or second opposite proximal raster line). Relative offset is pixel offset relative to the process target pixel in the target raster line. As when creating an error matrix for error diffusion, the shift-target line matrix is shifted to cancel the relative offset. That is, the shift-target line matrix is shifted from the first line matrix LM1 in the direction opposite the direction of relative offset by an amount equivalent to the relative offset.

Error matrices MLa and MLb for error accumulation shown in FIG. 22(B) are suitable for two-way offset of an amount s=+1 and are substantially equivalent to the error matrices MBa and MBb for error diffusion (FIG. 8(B)). Error matrices MMa and MMb for error accumulation shown in FIG. 22(C) are suitable for two-way offset of an amount s=+0.5 and are substantially equivalent to the error matrices MC2a and MC2b for error diffusion (FIG. 8(C)). Error matrices MNa and MNb for error accumulation shown in FIG. 23 are suitable for offset of an amount k=+1/16 due to horizontal head skew and are substantially equivalent to the error matrices MEa and MEb for error diffusion (FIG. 14(B)).

In the fifth embodiment described above, the CPU 110 executes a halftone process similar to that described above in the first through fourth embodiments, but using a method of error accumulation in place of the error diffusion method. The method described in the fifth embodiment achieves the same operations and effects described in the first through fourth embodiments and, hence, can minimize a decrease in print quality due to pixel offset, even for various types of pixel offset.

F. Sixth Embodiment

Figure 24:
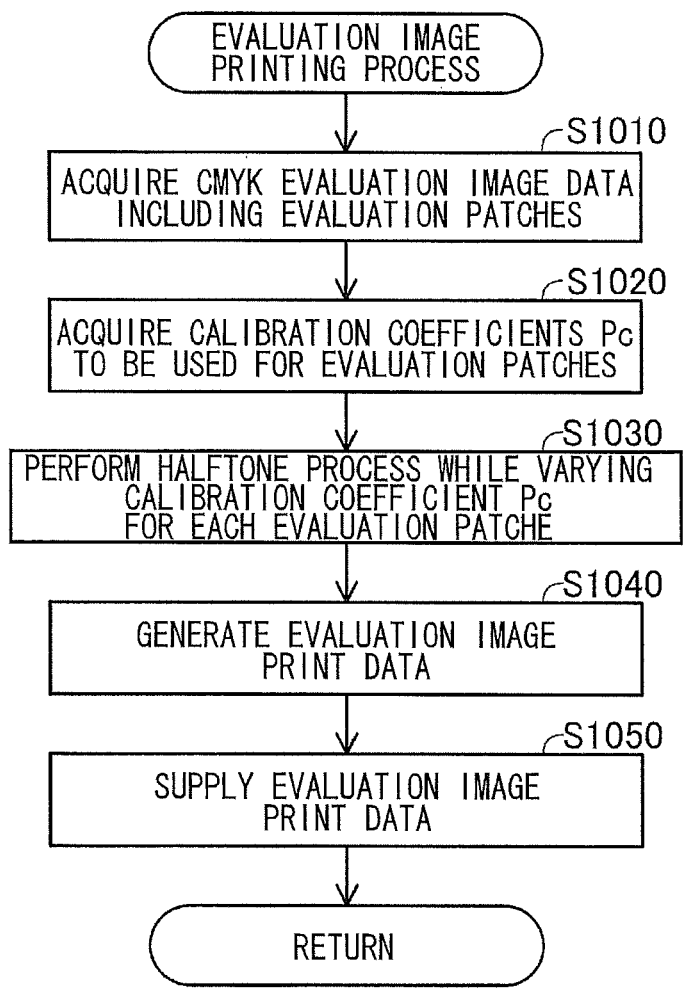
FIG. 24 is a flowchart illustrating steps in an evaluation image printing process according to a sixth embodiment of the present invention.

Next, the structure and process for generating the calibration coefficient data 138 according to a sixth embodiment will be described. FIG. 24 is a flowchart illustrating steps in an evaluation image printing process. The control unit 100 of the MFP 600 executes the evaluation image printing process when the control unit 100 receives a print command from the user, for example. The print command may be a direct specification to print an evaluation image, or may be a command in the form of a request to improve the image quality, such as graininess.

Figure 25:
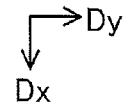
FIG. 25 shows an example of an evaluation images printed in the evaluation image printing process.

In S1010 at the beginning of the evaluation image printing process, the CPU 110 performs the evaluation image data generation process M110 to acquire CMYK evaluation image data. The CMYK evaluation image data is bitmap data constituting CMYK image data and represents an evaluation image set IM1 including a plurality of evaluation images. The CMYK evaluation image data is configured of a plurality of sets of test pixel data each having 256-levels gradation value. FIG. 25 illustrates the general content of the evaluation image set IM1.

The evaluation image set IM1 includes a group of cyan patches CG, a group of magenta patches MG, a group of yellow patches YG, and a group of black patches KG. Each of the color patches included in the cyan patches CG, magenta patches MG, yellow patches YG, and black patches KG has a specific value for the color component corresponding to the group color, i.e, cyan, magenta, yellow, or black, and a value of zero for all other components. The specific value is set to represent a density suitable for evaluating graininess (128, for example, which is the intermediate value for 256 levels). Each of the groups of cyan patches CG, magenta patches MG, yellow patches YG, and black patches KG has three rows of patches aligned in the main scanning direction (+Dy and −Dy directions). The three rows of patches for each color include a row for a first type of evaluation patch (first evaluation patch types CPb, MPb, YPb, and KPb), a row for a second type of evaluation patch (second evaluation patch types CPf, MPf, YPf, and KPf), and a row for a third type of evaluation patch (third evaluation patch types CPr, MPr, YPr, and KPr). The first evaluation patch types CPb, MPb, YPb, and KPb include patches for evaluating two-way offset. The second evaluation patch types CPf, MPf, YPf, and KPf include patches for evaluating offset due to head skew during forward printing. The third evaluation patch types CPr, MPr, YPr, and KPr include patches for evaluating offset due to head skew during reverse printing.

In S1020 of FIG. 24, the CPU 110 acquires the calibration coefficients Pc to be used for the evaluation patches. More specifically, the CPU 110 acquires a calibration coefficient Pcb for the first evaluation patch types CPb, MPb, YPb, and KPb, and a calibration coefficient Pcg for the second evaluation patch types CPf, MPf, YPf, and KPf and the third evaluation patch types CPr, MPr, YPr, and KPr. The calibration coefficient Pcb serves to evaluate two-way offset, while the calibration coefficient Pcg serves to evaluate offset due to head skew.

In S1030 the CPU 110 executes the halftone process while varying the calibration coefficient Pc used for each evaluation patch based on the acquired calibration coefficients Pcb and Pcg. That is, the CPU 110 sets the value of the calibration coefficient Pc and type of error matrix to be used for a halftone process performed on each evaluation patch. The CPU 110 executes the halftone process M106 to create an error matrix of the type using the calibration coefficient Pc set in S1020 and executes the halftone process for each evaluation patch. In other words, the CPU 110 acquires a plurality of error matrices to be used for printing the evaluation image sets IM1 in association with offset amount of ink dot. Through this process, the CMYK pixel data representing each evaluation patch is converted to dot data.

Figure 26:
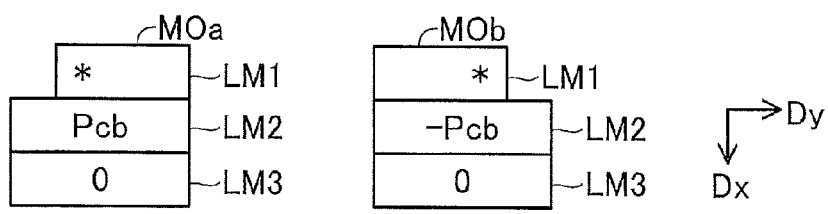
FIGS. 26(A) and 26(B) show sample error matrices used in the halftone process for printing the evaluation images.
Figure 26:
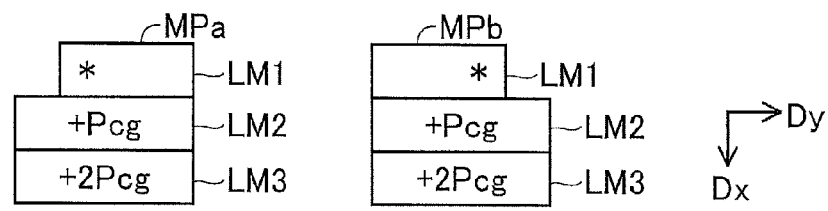

FIGS. 26 (A) and 26(B) illustrates error matrices used for generating evaluation image data. FIG. 26(A) shows sample error matrices used in halftone processes performed on the first type of evaluation patches. An error matrix in a halftone process for certain evaluation patches will also be referred to as the error matrix corresponding to these evaluation patches. This example shows error matrices MOa and MOb used when the calibration coefficient Pc is Pcb. In FIGS. 26(A) and 26(B), the shift amount is indicated in the line matrices LM2 and LM3 of each error matrix. For example, the error matrix MOa is created by shifting the second line matrix LM2 of the reference error matrix MAa (FIG. 8(A)) the amount Pcb in the forward direction, while the error matrix MOb is created by shifting the second line matrix LM2 in the reference error matrix MAb (FIG. 8(A)) the amount Pcb in the reverse direction. Based on this shifting configuration, it is clear that the error matrices MOa and MOb are of a type used for two-way offset. The error matrices MOa and MOb will be called two-way offset error matrices corresponding to a calibration coefficient Pc of Pcb.

FIG. 26(B) shows sample error matrices corresponding to the second and third type of evaluation patches. This example shows error matrices MPa and MPb used when the calibration coefficient Pc is Pcg. The error matrix MPa is obtained by shifting the second line matrix LM2 of the reference error matrix MAa by the amount Pcg in the forward direction and by shifting the third line matrix LM3 in the reference error matrix MAa by the amount 2×Pcg in the forward direction. The error matrix MPb is obtained similarly by shifting the reference error matrix MAb. As is clearly by this shifting configuration, the error matrices MPa and MPb are of a type used for offset due to head skew. Thus, the error matrices MPa and MPb will be called head skew error matrices corresponding to a calibration coefficient Pc of Pcg.

The values indicated in each evaluation patch (rectangular box) of the evaluation image set IM1 indicated in FIG. 25 is the value of the calibration coefficient Pc used to create the error matrix corresponding to that evaluation patch. This value will be called the calibration coefficient corresponding to the evaluation patch. For example, seven first evaluation patch types CPb are arranged in the row of cyan first evaluation patch types CPb (the topmost row in FIG. 25). The seven first evaluation patch types CPb correspond to seven two-way offset error matrices having discrete values for the calibration coefficient Pc. The calibration coefficients Pc corresponding to the seven two-way offset error matrices are centered on zero and stepped by Pcb from −3Pcb to +3Pcb.

Seven second evaluation patch types CPf and seven third evaluation patch types CPr are similarly arranged in the corresponding rows of second evaluation patch types CPf (second row from the top in FIG. 25) and third evaluation patch types CPr (third row from the top in FIG. 25). The seven second evaluation patch types CPf and third evaluation patch types CPr in each row have corresponding head skew error matrices, each with a different value for the calibration coefficient Pc. The calibration coefficients Pc corresponding to the seven head skew error matrices are centered on zero and stepped by Pcg from −3Pcg to +3Pcg. The size of the Pcb or Pcg step may be a finer unit than a single printed pixel (one dot worth). If the size represented in unit pixels is 0<Pcb, Pcg<1, then the fractional shift technique described in the first embodiment may be used to create error matrices corresponding to the calibration coefficients Pc.

Although only the configuration of the cyan patches CG has been described in detail, the configurations of the magenta patches MG, yellow patches YG, and black patches KG are identical to that of the cyan patches CG, as shown in FIG. 25.

After generating dot data for the entire evaluation image set IM1 in the halftone process, in S1040 the CPU 110 performs the evaluation image data generation process M110 to generate evaluation image print data for printing the evaluation image set IM1. In the evaluation image data generation process M110, the CPU 110 generates the evaluation image print data so that each line comprising the first evaluation patch types CPb, MPb, YPb, and KPb is printed through two-way interlaced printing (see FIG. 5). The CPU 110 also generates the evaluation image print data so that the lines comprising the second evaluation patch types CPf, MPf, YPf, and KPf are printed unidirectionally with only forward printing, while the lines comprising the third evaluation patch types CPr, MPr, YPr, and KPr are printed unidirectionally with only reverse printing.

Here, the CPU 110 generates the evaluation image print data so that each row of patches printed by two-way interlaced printing (the row comprising the first evaluation patch types CPb, for example) is printed entirely in two passes including a single forward pass and a single reverse pass. Here, the sub scan between the single forward pass and the single reverse pass is equivalent to the dot pitch in the sub-scanning direction (half the nozzle pitch in this example), as in the combination of the pass P1(F) and the pass P2(R) in FIG. 5. By using the smallest sub-scanning distance in this way, it is possible to increase the width of the evaluation patches in the sub-scanning direction, despite printing the evaluation patches in few main scans. In other words, the evaluations patches that facilitate evaluation of printing quality can be printed in just a few main scans.

In S1050 the CPU 110 supplies the evaluation image print data to the printing unit 200. The printing unit 200 uses the evaluation image print data to print the evaluation image set IM1 on a sheet of printing medium 300.

After completing the evaluation image printing process (i.e., after printing the evaluation image set IM1), the control unit 100 executes a print setting process. FIG. 7 is a flowchart illustrating steps in the print setting process.

In S2010 at the beginning of the print setting process, the CPU 110 performs the image quality evaluation acquisition process M112 to acquire visual evaluation results from the user in response to the printed evaluation image set IM1. In the image quality evaluation acquisition process M112, the CPU 110 acquires results of visual evaluations for each row of evaluation patches in the evaluation image set IM1, that is, for each printing method and each ink color. For example, the user may use the operating unit 170 to input numbers of evaluation patches that the user felt had good quality (good graininess, for example) within each row of evaluation patches, and the CPU 110 receives this input via the operating unit 170.

In S2020 the CPU 110 performs the printing configuration process M114 to determine and set suitable values of calibration coefficients Pc for each printing method and each ink color based on the visual evaluation results acquired in S2010. Specifically, in the printing configuration process M114 the CPU 110 sets the calibration coefficient Pc corresponding each evaluation patch that the user indicated as being of good quality (see FIG. 25) as an appropriate calibration coefficient Pc. For example, the CPU 110 sets the calibration coefficient Pc found suitable for two-way printing based on the evaluation results of the first evaluation patch types CPb, the calibration coefficient Pc found suitable for forward printing based on the evaluation results of the second evaluation patch types CPf, and the calibration coefficient Pc found suitable for reverse printing based on the evaluation results of the third evaluation patch types CPr as suitable calibration coefficients Pc for printing in cyan.

In S2030 the CPU 110 stores all calibration coefficients Pc set according to the evaluation results in the nonvolatile memory 130 as the calibration coefficient data 138. The calibration coefficients Pc stored as the calibration coefficient data 138 can be used for creating error matrices when performing two-way interlaced printing or two-way non-interlaced printing.

The method of the sixth embodiment described above facilitates the printing of evaluation patches with the printing unit 200 that enable the user to evaluate changes in printing quality (changes in graininess, for example) caused by positional deviation in the main scanning direction of pixels on the printing medium 300 (pixel offset) relative to the positions in the main scanning direction of pixels in the image data (bitmap data BD, for example). More specifically, control unit 100 can vary the error matrix to print a suitable evaluation image set IM1 by changing the value of the calibration coefficient Pc, without having to perform complex control, such as adjusting the ink ejection timing.

The control unit 100 acquires an error matrix by shifting the shift-target line matrix of the reference error matrix MA in the main scanning direction based on the calibration coefficient Pc. Accordingly, the control unit 100 can easily control the printing unit 200 to print an evaluation image set IM1 on a sheet of printing medium 300 by which the user can evaluate changes in printing quality caused by offset between pixels in a target raster line and pixels in other raster lines.

Further, when the value of the calibration coefficient Pcb or Pcg by which the calibration coefficient Pc is stepped is a fraction of a unit pixel (0<Pcb, Pcg<1), the control unit 100 can create error matrices using a fractional shift method. Accordingly, the control unit 100 can easily control the printing unit 200 to print an evaluation image set IM1 by which the user can evaluate changes in printing quality caused by pixel offset less than a unit pixel.

The first type of evaluation patch in the sixth embodiment is used to evaluate two-way printing. The halftone process performed on the first type of evaluation patches in the sixth embodiment incorporates an error matrix set combining the error matrices MOa and MOb. The error matrix MOa is an example of a forward error matrix used when printing the raster line containing the process target pixel in a forward pass, while the error matrix MOb is an example of a reverse error matrix used when printing the raster line containing the process target pixel in a reverse pass. Here, the direction for shifting the shift-target line matrix (the second line matrix LM2) in the error matrix MOa is opposite the direction for shifting the shift-target line matrix in the error matrix MOb (see FIG. 26). With this configuration, the control unit 100 can easily control the printing unit 200 to print the first type of evaluation patches by which the user can evaluate changes in printing quality caused by pixel offset in two-way printing.

Further, the second and third types of evaluation patches are printed using one-way printing. Specifically, the second type of evaluation patches are printed using only forward passes, while the third type of evaluation patches are printed using only reverse patches. The halftone process applied to these evaluation patches uses the error matrices MP for offset due to head skew (see FIG. 26(B)). Accordingly, the control unit 100 can easily control the printing unit 200 to print the evaluation image set IM1 by which the user can evaluate changes in printing quality caused by offset among nozzles of the same color (e.g., offset due to head skew).

In some cases, the degree of pixel offset caused by head skew may differ between forward passes and reverse passes. This can occur when offset is generated by a combination of horizontal head skew (see FIG. 13) and vertical head skew (see FIG. 15). The MFP 600 according to the sixth embodiment prints an evaluation image set IM1 that includes both the second type of patches printed only in forward passes and the third type of patches printed only in reverse passes. Accordingly, the user can accurately evaluate changes in printing quality caused by pixel offset due to nozzle offset in the main scanning direction, such as that caused by head skew.

Further, the control unit 100 of the sixth embodiment acquires an evaluation of printing quality for the printed evaluation image set IM1 and creates the calibration coefficient data 138 (calibration coefficients Pc) to be used in later printing processes. Therefore, the control unit 100 can use the evaluation image set IM1 to set appropriate calibration coefficient data 138, thereby minimizing a decrease in printing quality in subsequent printing processes caused by pixel offset.

In the evaluation image set IM1 described in the sixth embodiment, evaluation patches printed according to the same printing method are aligned in a row along the main scanning direction. In other words, evaluation patches printed according to different methods are not combined in the same row along the main scanning direction. In this way, a plurality of evaluation patches can be printed more efficiently in the same main scan, thereby enabling the evaluation image set IM1 to be printed quickly. In the sixth embodiment, the control unit 100 varies the calibration coefficient Pc for the error diffusion matrices in order to vary the printing characteristics in evaluation patches of the same type, which also contributes to a reduced time in printing the evaluation image set IM1. If the control unit 100 were to vary printing characteristics of the evaluation patches by varying the ink ejection timing during main scans to produce pixel offset, for example, there is a possibility that evaluation patches aligned in the main scanning direction could not be printed in the same main scan. That is, it is possible that the plurality of evaluation patches aligned in the main scanning direction would have to be printed in separate main scans because it is difficult to modify the ink ejection timing accurately during a main scan.

G. Seventh Embodiment

Figure 19:
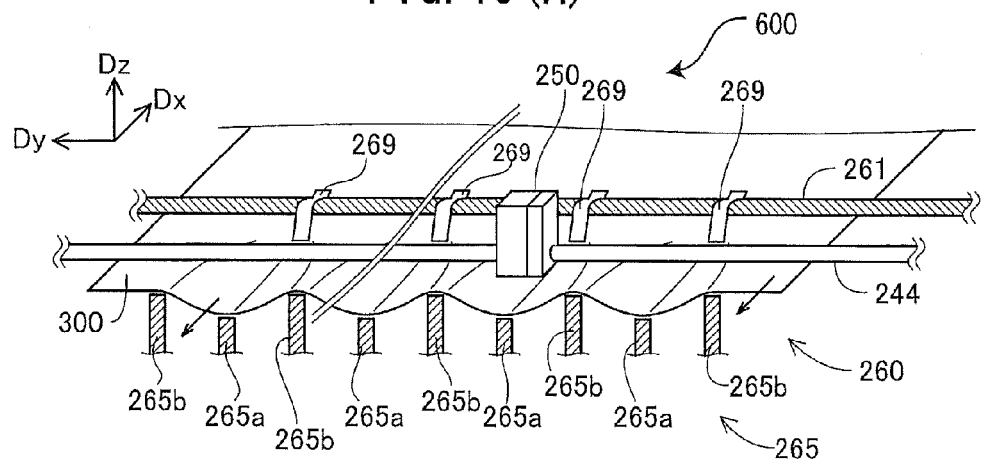
FIG. 19(A) is a partial perspective cross-section view of a printing unit of a multifunction peripheral according to a fourth embodiment of the present invention.
FIG. 19(B) is an explanatory diagram illustrating impact positions of the ink droplets in the fourth embodiment.
Figure 19:
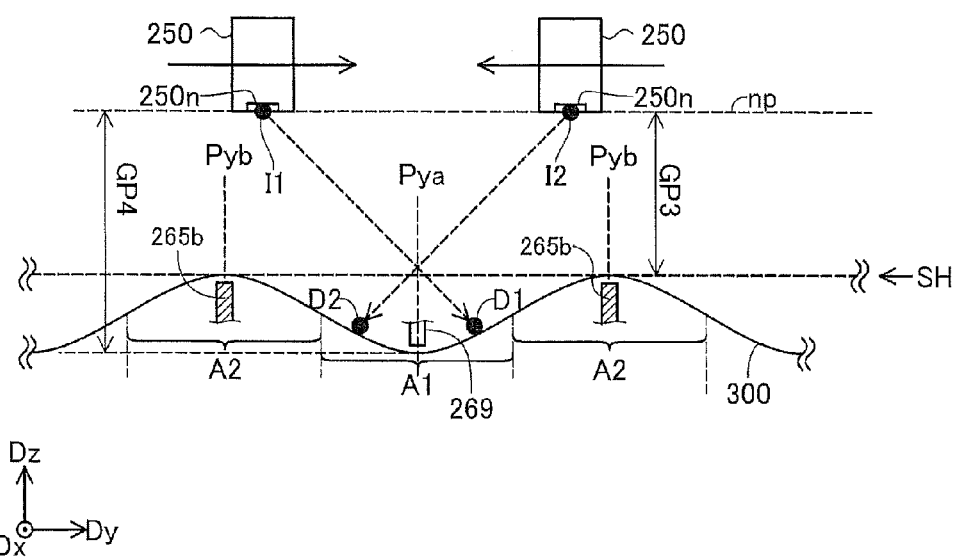

Next, an evaluation image set IM2 of a different format from the evaluation image set IM1 shown in FIG. 25 will be described as a seventh embodiment. FIG. 28 is an explanatory diagram showing the content of the evaluation image set IM2. The evaluation image set IM2 is used on a printing device having the sub-scanning unit 260 described in the fourth embodiment (FIG. 19). In other words, the evaluation image set IM2 is used on a device equipped with the sub-scanning unit 260 for conveying sheets of the printing medium 300 (executing sub scans), such as paper, while deforming the printing medium 300 in a wave-like shape along the main scanning direction.

In the evaluation image set IM2, a first patch group PG1 is arranged in each of the plurality of first regions A1 described with reference to FIG. 20(B), while a second patch group PG2 is arranged in each of the plurality of second regions A2. Each of the first patch groups PG1 includes seven of a first evaluation patches KPb aligned in the sub-scanning direction. Each of the second patch groups PG2 also includes seven of the first evaluation patches KPb aligned in the sub-scanning direction.

The seven first evaluation patches KPb in the first patch groups PG1 correspond to seven types of two-way offset error matrices, each with discrete values for the calibration coefficient Pc. The calibration coefficients Pc associated with the seven types of two-way offset error matrices are centered on 1.0 and stepped in units of Pcb from 1−3Pcb to 1+3Pcb. Similarly, the seven first evaluation patches KPb in each second patch group PG2 are associated with seven types of two-way offset error matrices, each with discrete values for the calibration coefficient Pc. The calibration coefficients Pc associated with the seven two-way offset error matrices are centered on zero and stepped in units of Pcb from −3Pcb to +3Pcb. Hence, the range of calibration coefficients Pc corresponding to the first evaluation patches KPb in the first patch groups PG1 differs from the range of calibration coefficients Pc corresponding to the first evaluation patches KPb in the second patch groups PG2. Each calibration coefficient Pc corresponds to the shift amount for the second line matrix LM2 in a two-way offset error matrix.

As described with reference to FIG. 19(B), the gap between the nozzle surface np and the printing medium 300 is relatively small in the second regions A2 (within a range near the gap GP3 shown in FIG. 19(B), while the gap is relatively large in the first regions A1 (a range near the gap GP4 shown in FIG. 19(B)). As described with reference to FIG. 19(B), since the ink ejection timing during a main scan is adjusted based on the second regions A2 that include the peaks Pyb, it is easy to predict that two-way offset (pixel offset) produced in the second regions A2 will approach zero, while two-way offset produced in the first regions A1 will be relatively large. For this reason, the two-way offset error matrices having a range of shift amounts centered on zero are correlated with the first evaluation patches KPb in the second patch groups PG2 arranged in the second regions A2. Similarly, the two-way offset error matrices having a range of shift amounts centered on a relatively high value (the shift amount corresponding to a calibration coefficient Pc of 1.0 in this example) are correlated with first evaluation patches KPb in the first patch groups PG1 arranged in the first regions A1.

Through Evaluations of image quality based on the evaluation image set IM2, the control unit 100 can acquire a suitable calibration coefficient Pc for each of the plurality of first regions A1 and the plurality of second regions A2. The control unit 100 can then create a suitable calibration coefficient data 138 (see FIG. 20(C)) using the acquired calibration coefficients Pc.

When the printing unit 200 performs sub scans while deforming the printing medium 300 so that the gap between the printing medium 300 and the nozzles varies along the main scanning direction, the evaluation image set IM2 makes it possible to evaluate changes in print quality caused by two-way offset (pixel offset) from the deformation in the printing medium 300.

Further, the range of shift amounts for corresponding error matrices differs between the first evaluation patches KPb arranged in the first regions A1 and the first evaluation patches KPb arranged in the second regions A2. This difference can minimize an increase in the number of first evaluation patches KPb.

Figure 27:
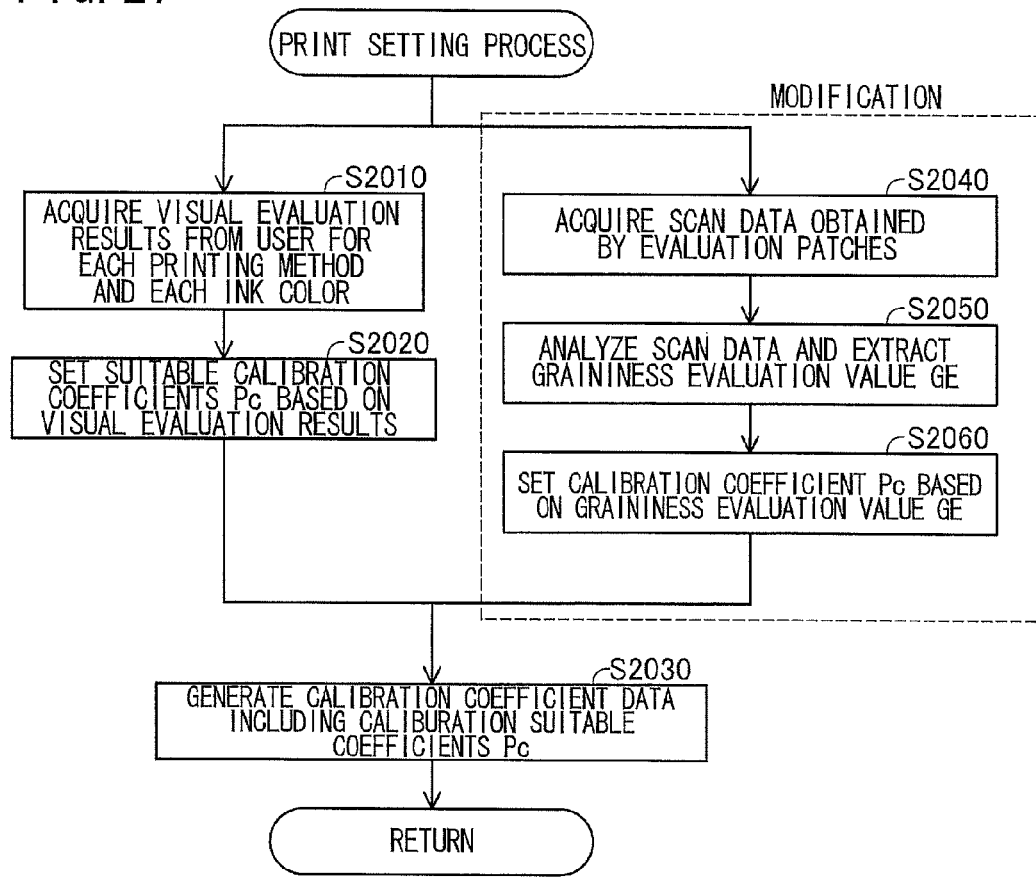
FIG. 27 is a flowchart illustrating steps in a print setting process according to the sixth embodiment and a modification of the sixth embodiment.

H. Variations of the Embodiments (1) In the print setting process described in the sixth embodiment with reference to FIG. 27, the CPU 110 may execute steps S2040-S2060, surround by a dashed line in FIG. 27, in place of steps S2010 and S2020.

In S2040 the CPU 110 controls the scanning unit 400 to scan the printing medium 300 on which the evaluation image set IM1 was printed and acquires the scan data generated by the scanning unit 400.

In S2050 the CPU 110 analyzes the scan data acquired in S2040 and extracts a graininess evaluation value GE. The graininess evaluation value GE serves to quantify the graininess of the printed image (image coarseness) and is calculated according to the following equation 3.

$$GE = (-1.8D)\int \sqrt{WS(u)} \cdot VTF(u) du \quad \text{(Equation 3)}$$

The graininess evaluation value GE is larger for a coarser printed image. Here, u is the spatial frequency having units of cycles per millimeters, WS(u) is the spatial frequency spectrum (Wiener spectrum) of the printed image, VTF(u) denotes the spatial frequency characteristics of human vision, and D denotes the average density of the printed image. In the image quality evaluation acquisition process M112, the CPU 110 converts the scan data to grayscale and applies a two-dimensional FFT (fast Fourier transform) to the data. Next, the CPU 110 converts the results obtained from the two-dimensional FFT into data expressed in the polar coordinate system in the image quality evaluation acquisition process M112. Specifically, the CPU 110 converts the two-dimensional polar coordinate system data into one dimension by averaging the angles to obtain a spatial frequency spectrum WS(u). The method of calculating the spatial frequency spectrum WS(u) and the graininess evaluation value GE are described, for example, in the article "Image Quality Evaluation of Inkjet Prints" in the *Journal of the Society of Photographic Science and Technology of Japan,* 60(6), 1997 (Makoto FUJINO).

In S2060 the CPU 110 executes the printing configuration process M114 to set a suitable value for the calibration coefficient Pc based on the graininess evaluation value GE acquired in S2050. Specifically, the CPU 110 identifies the evaluation patch having the smallest graininess evaluation value GE among the group of evaluation patches of the same color and same type. The CPU 110 sets the calibration coefficient Pc corresponding to the identified evaluation patch (see FIG. 25) as a suitable calibration coefficient Pc.

The variation of the embodiments described above can reduce the user's burden by analyzing the scan data to evaluate image quality.

(2) The first through seventh embodiments described above may be used in any combination. For example, the printing unit 200 may implement a first print mode for executing the two-way interlaced printing (two-pass printing) described in the first embodiment and may implement a second print mode for executing the two-way non-interlaced printing (one-pass printing) described in the second embodiment. In this case, the CPU 110 can obtain two-way offset error matrices (FIG. 8) for use in the first print mode, and head skew error matrices (FIG. 14) for use in the second print mode. Two-way offset is generated between odd-numbered lines and even-numbered lines in the first print mode, but not in the second print mode. In this type of situation, it is preferable to shift a specific line matrix in error matrices used in the first print mode in the main scanning direction relative to a line matrix corresponding to the error matrices used in the second print mode by the difference in pixel offset between the first print mode and second print mode.

The above variation can minimize a decrease in print quality caused by pixel offset in both the first print mode and the second print mode having different pixel offsets.

(3) While the printing unit 200 described in the embodiments and modifications is an inkjet printing mechanism, the present invention may be applied to a laser printing mechanism. Particularly, when a multi-beam laser is used to irradiate laser beams simultaneously on photosensitive members for a plurality of main scan lines, the position of a pixel in one main scan line may be offset in the main scanning direction from a pixel in another main scan line. In such a case, performing a halftone process as described in the embodiments using error matrices adjusted according to the pixel offset can minimize a decrease in the quality of the printed image caused by such pixel offset.

(4) In the sixth embodiment described above, the CPU 110 performs the printing configuration process M114 to set the values of calibration coefficients Pc described in the calibration coefficient data 138, but the present invention is not limited to this method. Since the calibration coefficients Pc are associated with the magnitude and direction of pixel offset, the CPU 110 can obtain the magnitude and direction of pixel offset produced in the printing unit 200 by identifying evaluation patches with the best quality (having the smallest graininess evaluation value GE, for example). The CPU 110 can implement a printing configuration by modifying the ink ejection timing based on the acquired pixel offset.

(5) In the embodiments and modifications described above, the CPU 110 shifts a line matrix in the reference error matrix MA using the calibration coefficient Pc to obtain an error matrix in the error matrix acquisition process M108. However, error matrices created in advance, i.e., with a pre-shifted line matrix, may be stored in the nonvolatile memory 130 as the error matrix data 136.

(6) In the first embodiment described above, an example is given of two-way offset being generated during two-pass, two-way interlaced printing, but the same technique can be used to improve image quality in various other printing methods for which two-way offset occurs. For example, pixel offset may be identified in first and second proximal raster lines relative to a process target pixel while considering various pass numbers, including three-pass printing, four-pass printing, and eight-pass printing, and various types of sub scans, including uniform conveyances and nonuniform conveyances. Then the corresponding line matrix may be shifted according to the positional offset to create an error matrix suited to the printing method.

(7) The control unit 100 and printing unit 200 in the embodiments may be configured as independent devices provided separately. Further, the functions required in the preferred embodiments for processing images to be printed may be shared among a plurality of computers capable of communicating via a network so that the computers as a group can provide the functions needed to process images being printed (the technology in this type of computer system is called "cloud computing"). For example, the process of analyzing scan data for the evaluation image set IM1 and calculating the graininess evaluation value GE (variation (1)) and the like may be implemented on a server (known as a "cloud server," for example) connected to and capable of communicating with the MFP 600.

(8) Parts of the configuration implemented in hardware in the embodiments may be replaced with software and, conversely, all or part of the configuration implemented in software in the embodiments may be replaced with hardware.

When all or part of the functions of the present invention are implemented in software, the software (i.e., computer programs) can be stored on a computer-readable storage medium. The "computer-readable storage medium" may be a portable medium, such as a memory card or CD-ROM; an internal storage device built into the computer, such as any of various RAM, ROM, or the like; or an external storage device, such as a hard disk drive, connected to the computer.

While the invention has been described in detail with reference to specific embodiments thereof, it would be apparent to those skilled in the art that many modifications and variations may be made therein without departing from the spirit of the invention, the scope of which is defined by the attached claims.

What is claimed is:

1. A print control device for controlling a printing unit to form an image on a printing medium, the print control device comprising:
a processor configured to:
acquire image data configured of a plurality of sets of pixel data each having a gradation value, each gradation value being represented by a first number of levels of gradation;
acquire a plurality of error matrices including a first error matrix and a second error matrix different from the first error matrix; and
generate print image data representing an image by performing a halftone process on the image data using the plurality of error matrices to convert each gradation value in the image data into a set of dot data, each set of dot data representing one of a second number of types of dot formation, the second number being smaller than the first number, the image including a first line and a second line parallel to the first line, the first line including a plurality of first pixels that are arranged in a main scanning direction of the printing unit and are to be printed in a forward direction, the second line including a plurality of second pixels that are arranged in the main scanning direction and are to be printed in a reverse direction opposite to the forward direction, a set of pixel data corresponding to one of the plurality of first pixels being generated by performing the halftone process using the first error matrix, a set of pixel data corresponding to one of the plurality of second pixels being generated by performing the halftone process using the second error matrix.

2. The print control device according to claim 1, wherein in the halftone process a gradation value of a set of pixel data is converted into a set of dot data based on a distribution error, the distribution error being obtained based on: one of the plurality of error matrices corresponding to the set of pixel data; and a difference between an input value of determined pixel data and an output value of the determined pixel data, the determined pixel data being a set of pixel data whose dot formation has been determined through the halftone process for the determined pixel data, the input value being represented by the first number of levels of gradation, the output value corresponding to the dot formation determined through the halftone process.

3. The print control device according to claim 1, wherein the image data includes a first line and a second line different from the first line, the first line extending in the predetermined direction and including target pixel data and a plurality of sets of first peripheral pixel data, the second line extending in a second direction parallel to the predetermined direction and including a plurality of sets of second peripheral pixel data, the plurality of sets of first peripheral pixel data and the plurality of sets of second peripheral pixel data being positioned within a predetermined range from the target pixel data;
wherein each of the plurality of error matrices includes a first line matrix and a second line matrix different from the first line matrix, the first line matrix defining an error distribution ratio of each of the plurality of sets of first peripheral pixel data, the second line matrix defining an error distribution ratio of each of the plurality of sets of second peripheral pixel data;
wherein the second line matrix of the second error matrix is positioned at a position shifted from a position at which the second line matrix of the first error matrix is positioned in the second direction.

4. The print control device according to claim 3, wherein the second line matrix of the second error matrix defines a multiplied distribution ratio for each of the plurality of sets of second peripheral pixel data, a multiplied distribution ratio of a subject set of second peripheral pixel data being determined by: multiplying a distribution ratio for the subject set of second peripheral pixel data of the first error matrix by a shift amount N wherein N is greater than zero and smaller than one; and subtracting the multiplied distribution ratio for the subject set of second peripheral pixel data from the distribution ratio for the subject set of second peripheral pixel data of the first error matrix.

5. The print control device according to claim 3, wherein the second line matrix included in the reverse error matrix of the second error matrix is shifted in a direction opposite to a direction in which the second line matrix included in the forward error matrix of the second error matrix is shifted.

6. A print control device for controlling a printing unit to form an image on a printing medium, the print control device comprising:
a processor configured to:
acquire image data configured of a plurality of sets of pixel data each having a gradation value, each gradation value being represented by a first number of levels of gradation;
acquire a plurality of error matrices including a first error matrix and a second error matrix different from the first error matrix; and
generate print image data representing an image by performing a halftone process on the image data using the plurality of error matrices to convert each gradation value in the image data into a set of dot data, each set of dot data representing one of a second number of types of dot formation, the second number being smaller than the first number, the image including a first region and a second region aligned in a row in a main scanning direction of the printing unit, the first region including a plurality of first pixels, the second region including a plurality of second pixels, a set of pixel data corresponding to one of the plurality of first pixels being generated by performing the halftone process using the first error matrix, a set of pixel data corresponding to one of the plurality of second pixels being generated by performing the halftone process using the second error matrix.

7. The print control device according to claim 6, wherein in the halftone process a gradation value of a set of pixel data is converted into a set of dot data based on a distribution error, the distribution error being obtained based on: one of the plurality of error matrices corresponding to the set of pixel data; and a difference between an input value of determined pixel data and an output value of the determined pixel data, the determined pixel data being a set of pixel data whose dot formation has been determined through the halftone process for the determined pixel data, the input value being represented by the first number of levels of gradation, the output value corresponding to the dot formation determined through the halftone process.

8. The print control device according to claim 6, wherein the image data includes a first line and a second line different from the first line, the first line extending in the predetermined direction and including target pixel data and a plurality of sets of first peripheral pixel data, the second line extending in a second direction parallel to the predetermined direction and including a plurality of sets of second peripheral pixel data, the plurality of sets of first peripheral pixel data and the plurality of sets of second peripheral pixel data being positioned within a predetermined range from the target pixel data;
wherein each of the plurality of error matrices includes a first line matrix and a second line matrix different from the first line matrix, the first line matrix defining an error distribution ratio of each of the plurality of sets of first peripheral pixel data, the second line matrix defining an error distribution ratio of each of the plurality of sets of second peripheral pixel data;

wherein the second line matrix of the second error matrix is positioned at a position shifted from a position at which the second line matrix of the first error matrix is positioned in the second direction.

9. The print control device according to claim 8, wherein the second line matrix of the second error matrix defines a multiplied distribution ratio for each of the plurality of sets of second peripheral pixel data, a multiplied distribution ratio of a subject set of second peripheral pixel data being determined by: multiplying a distribution ratio for the subject set of second peripheral pixel data of the first error matrix by a shift amount N wherein N is greater than zero and smaller than one; and subtracting the multiplied distribution ratio for the subject set of second peripheral pixel data from the distribution ratio for the subject set of second peripheral pixel data of the first error matrix.

10. The print control device according to claim 8, wherein the second line matrix included in the reverse error matrix of the second error matrix is shifted in a direction opposite to a direction in which the second line matrix included in the forward error matrix of the second error matrix is shifted.

11. The print control device according to claim 6, wherein the first region is a region where a gap formed between the printing medium and a sub-scanning unit falls within a first predetermined range and the second region is a region where a gap formed between the printing medium and the sub-scanning unit falls within a second predetermined range.

12. A print control device for controlling a printing unit to form a dot on a printing medium, the print control device comprising:
a processor configured to:
acquire test image data configured of a plurality of sets of test pixel data each having a gradation value, each gradation value being represented by a first number of levels of gradation, the plurality of sets of test pixel data including target pixel data;
acquire a plurality of error matrices including a first error matrix and a second error matrix different from the first error matrix, the first error matrix being used when an offset amount is a first offset amount, the second error matrix being used when the offset amount is a second offset amount different from the first offset amount, the offset amount being a distance between a first position and a second position in a predetermined direction, the first position at which a dot corresponding to the target pixel data is to be disposed and being determined based on the test image data, the second position at which a dot corresponding to the target pixel data is formed on the printing medium; and
generate evaluation image data representing a plurality of evaluation images by performing a halftone process on the test image data using the plurality of error matrices to convert each gradation value in the test image data into a set of dot data, each evaluation image including a plurality of patches, the plurality of evaluation images corresponding to the plurality of error matrices, respectively, each set of dot data representing one of a second number of types of dot formation, the second number being smaller than the first number.

13. The print control device according to claim 12, wherein in the halftone process a gradation value of a set of pixel data is converted into a set of dot data based on a distribution error, the distribution error being obtained based on: one of the plurality of error matrices corresponding to the set of pixel data; and a difference between an input value of determined pixel data and an output value of the determined pixel data, the determined pixel data being a set of pixel data whose dot formation has been determined through the halftone process for the determined pixel data, the input value being represented by the first number of levels of gradation, the output value corresponding to the dot formation determined through the halftone process.

14. The print control device according to claim 12, wherein the test image data includes a first line and a second line different from the first line, the first line extending in the predetermined direction and including the target pixel data and a plurality of sets of first peripheral pixel data, the second line extending in a second direction parallel to the predetermined direction and including a plurality of sets of second peripheral pixel data, the plurality of sets of first peripheral pixel data and the plurality of sets of second peripheral pixel data being positioned within a predetermined range from the target pixel data;
- wherein each of the plurality of error matrices includes a first line matrix and a second line matrix different from the first line matrix, the first line matrix defining an error distribution ratio of each of the plurality of sets of first peripheral pixel data, the second line matrix defining an error distribution ratio of each of the plurality of sets of second peripheral pixel data;
- wherein the second line matrix of the second error matrix is positioned at a position shifted from a position at which the second line matrix of the first error matrix is positioned in the second direction.

15. The print control device according to claim 14, wherein the second line matrix of the second error matrix defines a multiplied distribution ratio for each of the plurality of sets of second peripheral pixel data, a multiplied distribution ratio of a subject set of second peripheral pixel data being determined by: multiplying a distribution ratio for the subject set of second peripheral pixel data of the first error matrix by a shift amount N wherein N is greater than zero and smaller than one; and subtracting the multiplied distribution ratio for the subject set of second peripheral pixel data from the distribution ratio for the subject set of second peripheral pixel data of the first error matrix.

16. The print control device according to claim 14, wherein the printing unit includes:
- a print head having a plurality of nozzles through which ink droplets are ejected;
- a main scanning unit configured to control the print head to perform a main scan in which the print head moves in main scanning directions relative to the printing medium, the main scanning directions corresponding to the predetermined direction and including a forward direction and a reverse direction;
- a sub-scanning unit configured to perform a sub scan in which the printing medium is conveyed relative to the print head in a sub scanning direction perpendicular to the main scanning direction;
- a head driving unit configured to drive the print head to form a dot having one of the second number of dot formations on the printing medium while the main scanning unit is performing the main scan; and
- a print control unit configured to performs a bi-direction printing including a forward printing in which the main scanning unit controls the print head to perform the main scan in the forward direction and a reverse printing in which the main scanning unit controls the print head to perform the main scan in the reverse direction,
- wherein each of the plurality of error matrices is a single group of error matrices including a forward error matrix and a reverse error matrix, the forward error matrix being used when the first line is printed by the forward printing, the reverse error matrix being used when the second line is printed by the reverse printing,
- wherein the second line matrix included in the reverse error matrix of the second error matrix is shifted in a direction opposite to a direction in which the second line matrix included in the forward error matrix of the second error matrix is shifted,
- wherein the processor generates the evaluation image data representing the plurality of evaluation images by performing the halftone process on the test image data using the plurality of groups of error matrices.

17. The print control device according to claim 16, wherein the sub scanning unit performs the sub scan in the recording medium having a plurality of first regions and a plurality of second regions different from the plurality of first regions, a gap formed between the print head and each of the plurality of first regions falling within a first predetermined range, a gap formed between the print head and each of the plurality of second regions falling within a second determined range different from the first predetermined range,
- wherein the processor generates the evaluation image data representing a first evaluation image formed on each of the plurality of first regions and a second evaluation image formed on each of the plurality of second regions.

18. The print control device according to claim 17, wherein the plurality of groups of error matrices includes a first error matrix group for the first evaluation image and a second error matrix group for the second evaluation image, the first error matrix set having a range of shift amounts of the second line matrix different from a range of shift amounts of the second line matrix of the second error matrix group.

19. The print control device according to claim 16, wherein the plurality of nozzles are aligned in the sub-scanning direction at a prescribed dot pitch,
- wherein the sub-scanning unit is configured to perform the sub scan in which the printing medium is conveyed relative to the print head in the sub scanning direction for a conveyance amount between a forward printing and a reverse printing subsequent to the forward printing, the conveyance amount being equivalent to the prescribed dot pitch.

20. The print control device according to claim 16, wherein the processor is configured to generate the evaluation image data such that the print head prints the plurality of evaluation images on the recording medium in one main scan.

21. The print control device according to claim 12, wherein the printing unit includes:
- a print head having a plurality of nozzles through which ink droplets are ejected;
- a main scanning unit configured to control the print head to perform a main scan in which the print head moves in main scanning directions relative to the printing medium, the main scanning directions corresponding to the predetermined direction and including a forward direction and a reverse direction;
- a sub-scanning unit configured to perform a sub scan in which the printing medium is conveyed relative to the print head in a sub scanning direction perpendicular to the main scanning direction;
- a head driving unit configured to drive the print head to form a dot having one of the second number of dot formations on the printing medium while the main scanning unit is performing the main scan; and
- a print control unit configured to performs a bi-direction printing including a forward printing in which the main scanning unit controls the print head to perform the main scan in the forward direction and a reverse printing in which the main scanning unit controls the print head to perform the main scan in the reverse direction, wherein the plurality of nozzles includes a plurality of same color nozzles through which ink droplets having same color are ejected, the plurality of same color nozzles being arranged in the sub-scanning direction;

wherein the evaluation image data represents the plurality of evaluation images to be printed by the one of the forward printing and the reverse printing.

22. The print control device according to claim 21, wherein the evaluation image data represents the plurality of evaluation images to be printed by the reverse printing.

23. The print control device according to claim 12, wherein the processor is further configured to:

acquire an evaluation result of the plurality of evaluation images printed by the printing unit based on the evaluation image data; and determine a print setting to be used in the printing unit based on the evaluation result.

24. The print control device according to claim 23, wherein the processor is further configured to:

acquire read data obtained by reading the plurality of evaluation images with a reading unit; and determine the evaluation result by analyzing the read data.

25. A non-transitory computer readable storage medium storing a set of program instructions installed on and executed by a computer for controlling a print control device, the program instructions comprising:

acquiring image data configured of a plurality of sets of pixel data each having a gradation value, each gradation value being represented by a first number of levels of gradation;

acquiring a plurality of error matrices including a first error matrix and a second error matrix different from the first error matrix; and generating print image data representing an image by performing a halftone process on the image data using the plurality of error matrices to convert each gradation value in the image data into a set of dot data, each set of dot data representing one of a second number of types of dot formation, the second number being smaller than the first number, the image including a first line and a second line parallel to the first line, the first line including a plurality of first pixels that are arranged in a main scanning direction of the printing unit and are to be printed in a forward direction, the second line including a plurality of second pixels that are arranged in the main scanning direction and are to be printed in a reverse direction opposite to the forward direction, a set of pixel data corresponding to one of the plurality of first pixels being generated by performing the halftone process using the first error matrix, a set of pixel data corresponding to one of the plurality of second pixels being generated by performing the halftone process using the second error matrix.

26. A non-transitory computer readable storage medium storing a set of program instructions installed on and executed by a computer for controlling a print control device, the program instructions comprising:

acquiring image data configured of a plurality of sets of pixel data each having a gradation value, each gradation value being represented by a first number of levels of gradation;

acquiring a plurality of error matrices including a first error matrix and a second error matrix different from the first error matrix; and generating print image data representing an image by performing a halftone process on the image data using the plurality of error matrices to convert each gradation value in the image data into a set of dot data, each set of dot data representing one of a second number of types of dot formation, the second number being smaller than the first number, the image including a first region and a second region aligned in a row in a main scanning direction of the printing unit, the first region including a plurality of first pixels, the second region including a plurality of second pixels, a set of pixel data corresponding to one of the plurality of first pixels being generated by performing the halftone process using the first error matrix, a set of pixel data corresponding to one of the plurality of second pixels being generated by performing the halftone process using the second error matrix.

27. A non-transitory computer readable storage medium storing a set of program instructions installed on and executed by a computer for controlling a print control device, the program instructions comprising:

acquiring test image data configured of a plurality of sets of test pixel data each having a gradation value, each gradation value being represented by a first number of levels of gradation, the plurality of sets of test pixel data including target pixel data;

acquiring a plurality of error matrices including a first error matrix and a second error matrix different from the first error matrix, the first error matrix being used when an offset amount is a first offset amount, the second error matrix being used when the offset amount is a second offset amount different from the first offset amount, the offset amount being a distance between a first position and a second position in a predetermined direction, the first position at which a dot corresponding to the target pixel data is to be disposed and being determined based on the test image data, the second position at which a dot corresponding to the target pixel data is formed on a printing medium; and generating evaluation image data representing a plurality of evaluation images by performing a halftone process on the test image data using the plurality of error matrices to convert each gradation value in the test image data into a set of dot data, each evaluation image including a plurality of patches, the plurality of evaluation images corresponding to the plurality of error matrices, respectively, each set of dot data representing one of a second number of types of dot formation, the second number being smaller than the first number.

* * * * *